(12) United States Patent
Maeda

(10) Patent No.: US 12,246,562 B2
(45) Date of Patent: Mar. 11, 2025

(54) TIRE WEAR STATE ESTIMATION APPARATUS

(71) Applicant: SUMITOMO RUBBER INDUSTRIES, LTD., Kobe (JP)

(72) Inventor: Yusuke Maeda, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 632 days.

(21) Appl. No.: 17/552,160

(22) Filed: Dec. 15, 2021

(65) Prior Publication Data
US 2022/0203783 A1 Jun. 30, 2022

(30) Foreign Application Priority Data

Dec. 24, 2020 (JP) .................. 2020-215107

(51) Int. Cl.
*B60C 23/06* (2006.01)
*B60C 11/24* (2006.01)
*G01M 17/02* (2006.01)

(52) U.S. Cl.
CPC .......... *B60C 23/061* (2013.01); *B60C 11/246* (2013.01); *G01M 17/02* (2013.01)

(58) Field of Classification Search
CPC ..... B60C 23/061; B60C 11/24; B60C 23/064; B60C 11/243; B60C 11/246;
(Continued)

(56) References Cited

U.S. PATENT DOCUMENTS 6,076,035 A * 6/2000 Yanase .................. B60C 19/00
73/146
8,483,976 B2 7/2013 Morinaga
(Continued)

FOREIGN PATENT DOCUMENTS

DE 698 17 698 T2 3/2004
EP 2 982 521 A1 2/2016
(Continued)

OTHER PUBLICATIONS

Japanese Office Action for Japanese Application No. 2020-215107, dated Jun. 4, 2024, with English translation.
(Continued)

*Primary Examiner* — Kristina M Deherrera
*Assistant Examiner* — Gedeon M Kidanu
(74) *Attorney, Agent, or Firm* — Birch, Stewart, Kolasch & Birch, LLP

(57) ABSTRACT

An estimation apparatus includes a rotation speed acquisition unit, a driving force acquisition unit, a slip ratio calculation unit, a slope calculation unit, and an estimation unit. The rotation speed acquisition unit sequentially acquires rotation speeds of the tires. The driving force acquisition unit sequentially acquires a driving force of the vehicle. The slip ratio calculation unit calculates a slip ratio based on the sequentially-acquired rotation speeds of the tires. The slope calculation unit calculates the slope of the slip ratio with respect to the driving force based on a large number of data sets of the slip ratio and the driving force, as a regression coefficient representing a linear relationship between the slip ratio and the driving force. The estimation unit estimates the wear state of the tires based on the slope.

14 Claims, 20 Drawing Sheets

(58) Field of Classification Search
CPC ......... B60C 2019/004; B60C 23/0408; B60W 2050/0028; B60W 40/12; G01M 17/02
See application file for complete search history.

(56) References Cited

U.S. PATENT DOCUMENTS

| | | |
|---|---|---|
| 9,610,810 B1 | 4/2017 | Singh |
| 10,112,444 B2 * | 10/2018 | Takahashi ............... B60C 19/00 |
| 2002/0116145 A1 * | 8/2002 | Kawasaki ............ B60C 23/061 |
| | | 702/148 |
| 2006/0076095 A1 | 4/2006 | Oshiro |
| 2011/0209521 A1 * | 9/2011 | Shiozawa ............... B60T 8/172 |
| | | 73/9 |
| 2015/0251658 A1 * | 9/2015 | Kato ....................... B60L 3/102 |
| | | 701/22 |
| 2016/0039311 A1 * | 2/2016 | Kato .................... B60L 15/025 |
| | | 701/22 |

FOREIGN PATENT DOCUMENTS

| | | | |
|---|---|---|---|
| JP | 8-122352 | A | 5/1996 |
| JP | 11-78442 | A | 3/1999 |
| JP | 2006-88908 | A | 4/2006 |
| JP | 5620268 | B2 | 11/2014 |
| JP | 2015-51649 | A | 3/2015 |
| JP | 2016-34826 | A | 3/2016 |

OTHER PUBLICATIONS

Extended European Search Report for European Application No. 21213043.9, dated May 17, 2022.

\* cited by examiner

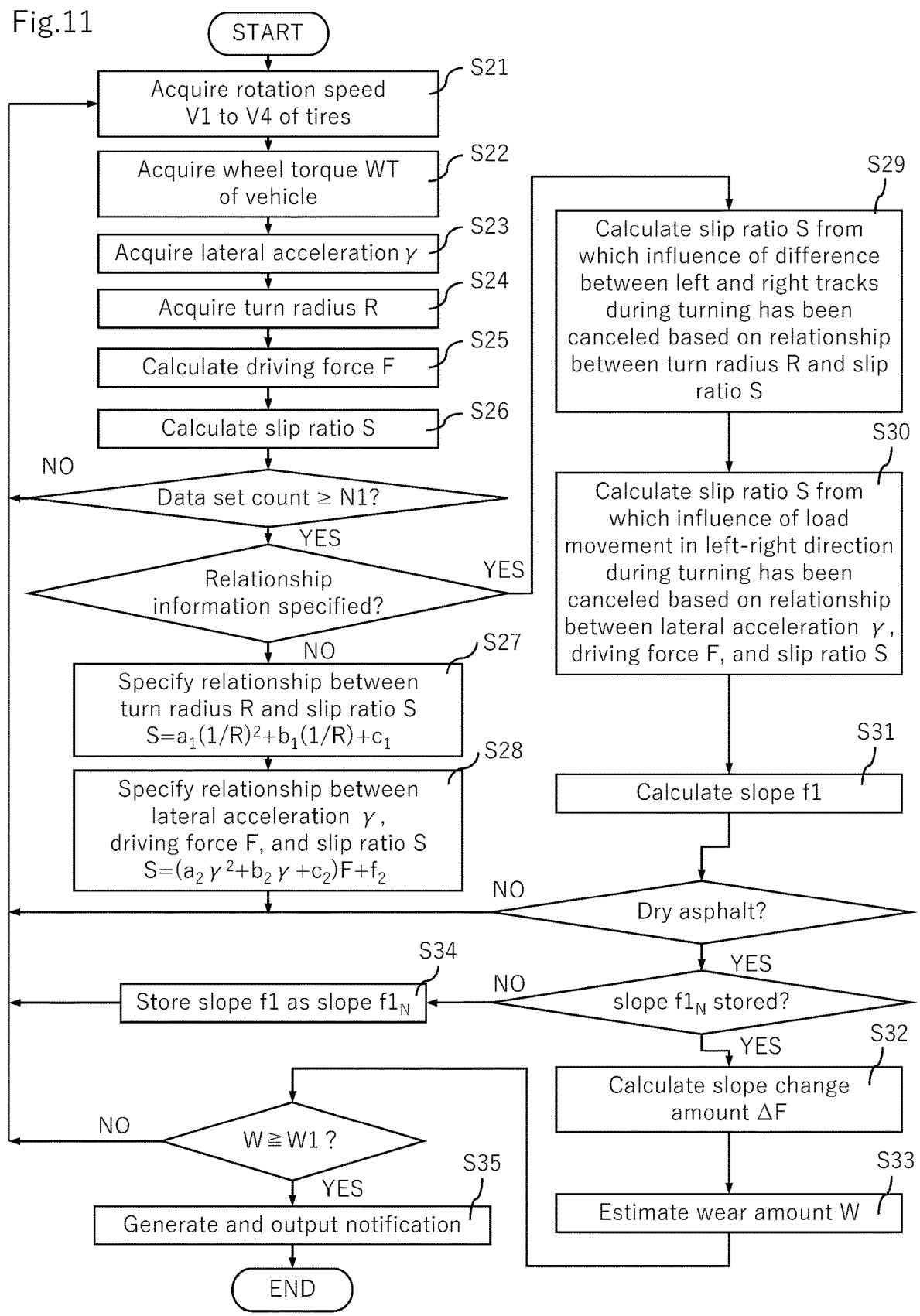

TIRE WEAR STATE ESTIMATION APPARATUS

CROSS REFERENCE

This application claims a priority to Japanese Patent Application No. 2020-215107 filed on Dec. 24, 2020, which is hereby incorporated by reference in its entirety.

BACKGROUND

The present invention relates to an estimation apparatus, method, and program for estimating a wear state of tires mounted on a vehicle.

Keeping track of the wear state of tires is important for properly managing tires and maintaining proper travel of a vehicle. The fact that a tire is worn can be understood by, for example, a slip sign that appears on the outside of the tire. However, the driver does not always check the slip sign. For this reason, a technique for automatically estimating tire wear has been proposed (e.g., Japanese Patent No. 5620268). In Japanese Patent No. 5620268, an acceleration sensor is arranged on an inner liner of a tire, and the degree of tire wear is estimated by time-differentiating a time-series waveform of acceleration in the radial direction of the tire detected by the acceleration sensor.

Japanese Patent No. 5620268 is an example of related art.

SUMMARY

However, when the acceleration sensor is installed inside the tire, there is a risk that the acceleration sensor will separate from the tire due to the force applied to the tire during rotation of the tire, and correct data can no longer be acquired.

An object of the present invention is to provide an estimation apparatus, a method, and a program according to which it is possible to estimate a wear state of tires using a sensor mounted in a vehicle.

An apparatus according to a first aspect of the present invention is an estimation apparatus for estimating a wear state of tires mounted on a vehicle, and includes a rotation speed acquisition unit, a driving force acquisition unit, a slip ratio calculation unit, a slope calculation unit, and an estimation unit. The rotation speed acquisition unit sequentially acquires rotation speeds of the tires. The driving force acquisition unit sequentially acquires a driving force of the vehicle. The slip ratio calculation unit calculates a slip ratio based on the sequentially-acquired rotation speeds of the tires. The slope calculation unit calculates the slope of the slip ratio with respect to the driving force based on a large number of data sets of the slip ratio and the driving force, as a regression coefficient representing a linear relationship between the slip ratio and the driving force. The estimation unit estimates the wear state of the tires based on the slope.

An estimation apparatus according to a second aspect of the present invention is the estimation apparatus according to the first aspect, further including a lateral acceleration acquisition unit configured to sequentially acquire lateral acceleration applied to the vehicle. According to the sequentially-acquired lateral acceleration, the slip ratio calculation unit sequentially selects and acquires any one from a group consisting of a first slip ratio, a second slip ratio, and a third slip ratio, the first slip ratio being the slip ratio of the tires calculated based on a rotation speed of a left tire among the sequentially-acquired rotation speeds of the tires, the second slip ratio being the slip ratio of the tires calculated based on a rotation speed of a right tire, and the third slip ratio being the slip ratio of the tires calculated based on an average rotation speed of the left and right tires.

An estimation apparatus according to a third aspect of the present invention is the estimation apparatus according to the second aspect, in which, according to the lateral acceleration, the slip ratio calculation unit selects the first slip ratio when the vehicle performs a right turn, selects the second slip ratio when the vehicle performs a left turn, and selects the third slip ratio when the vehicle travels straight.

An estimation apparatus according to a fourth aspect of the present invention is the estimation apparatus according to any one of the first to third aspects, further including: a turn radius acquisition unit configured to acquire the turn radius of the vehicle; and a first correction unit configured to correct the slip ratio based on first relationship information indicating a relationship between the turn radius and the slip ratio, and the turn radius at the time of correction.

An estimation apparatus according to a fifth aspect of the present invention is the estimation apparatus according to the fourth aspect, in which the first relationship information is information in which the slip ratio is represented by a quadratic function of a reciprocal of the turn ratio.

An estimation apparatus according to a sixth aspect of the present invention is the estimation apparatus according to any one of the first to fifth aspects, further including: a lateral acceleration acquisition unit configured to sequentially acquire lateral acceleration applied to the vehicle; and a second correction unit configured to correct the slip ratio based on second relationship information indicating a relationship between the lateral acceleration, the driving force, and the slip ratio, and the lateral acceleration and the driving force at the time of correction.

An estimation apparatus according to a seventh aspect of the present invention is the estimation apparatus according to the sixth aspect, in which the second relationship information is information in which the slip ratio is represented by a linear function of the driving force and the slope of the slip ratio with respect to the driving force is represented by a quadratic function of the lateral acceleration.

An estimation method according to an eighth aspect of the present invention is an estimation method for estimating a wear state of tires mounted on a vehicle, and includes the following. Also, an estimation program according to a ninth aspect is an estimation program for estimating a wear state of tires mounted on a vehicle, and causes a computer to execute the following. Sequentially acquiring rotation speeds of the tires; sequentially acquiring a driving force of the vehicle; calculating a slip ratio based on the sequentially-acquired rotation speeds of the tires; calculating a slope of the slip ratio with respect to the driving force based on a large number of data sets of the slip ratio and the driving force as a regression coefficient representing a linear relationship between the slip ratio and the driving force; and estimating the wear state of the tires based on the slope.

According to the present invention, a wear state of tires can be estimated using a detection value of a sensor generally mounted on a vehicle.

BRIEF DESCRIPTION OF THE DRAWINGS

FIG. 11 is a flowchart showing a flow of wear state estimation processing according to the second embodiment.

DETAILED DESCRIPTION

Hereinafter, an estimation apparatus, a method, and a program according to several embodiments of the present invention will be described with reference to the drawings.

1. First Embodiment 1-1. Configuration of Estimation Apparatus

Figure 1:
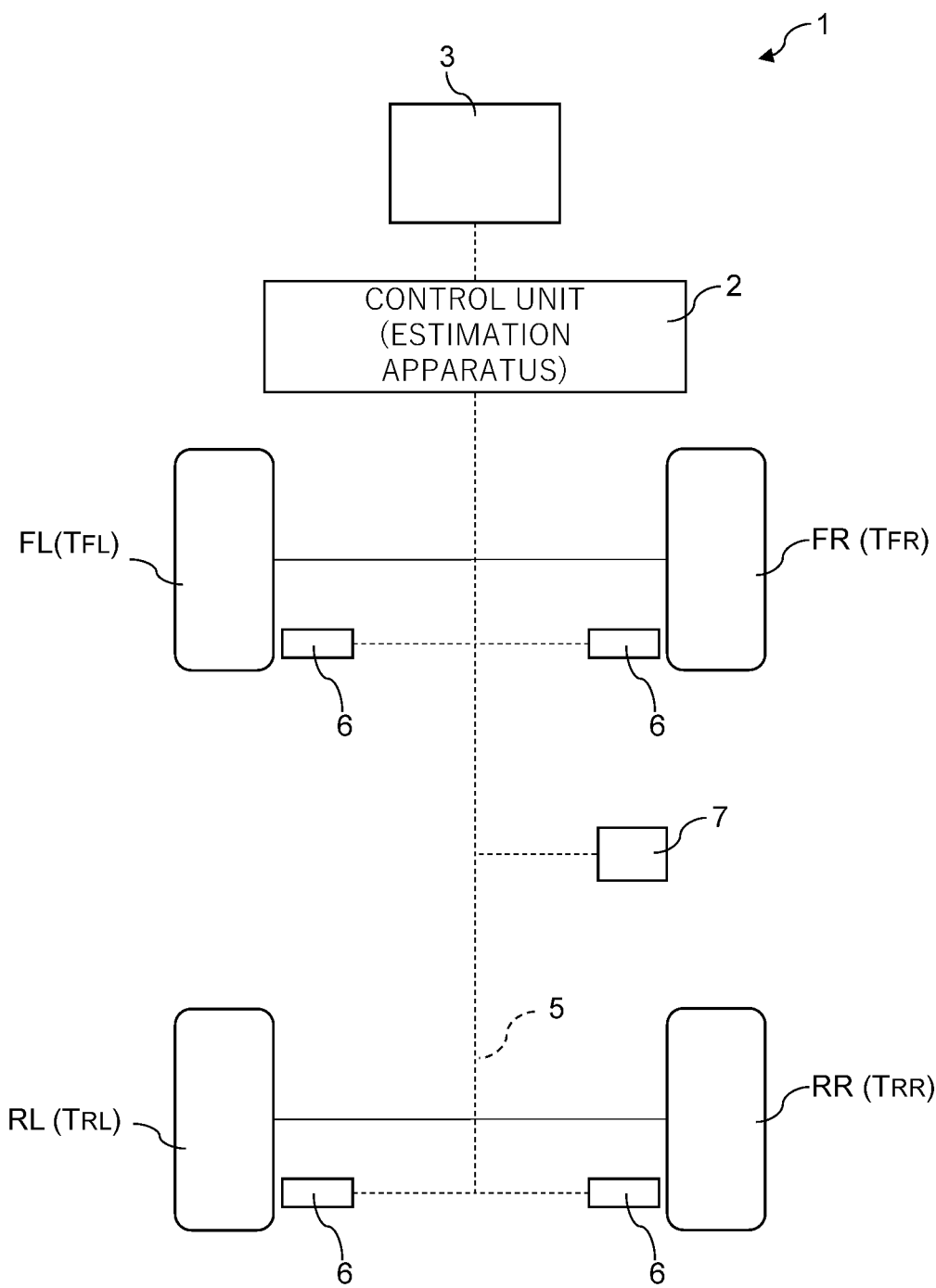
FIG. 1 is a schematic view showing a state in which a control unit serving as an estimation apparatus according to a first embodiment is mounted on a vehicle.

FIG. 1 is a schematic view showing a state in which a control unit 2 serving as the estimation apparatus according to the first embodiment is mounted in a vehicle 1. The vehicle 1 is a four-wheeled vehicle, and includes a left front wheel FL, a right front wheel FR, a left rear wheel RL, and a right rear wheel RR. Tires $T_{FL}$, $T_{FR}$, $T_{RL}$, and $T_{RR}$ are mounted on the wheels FL, FR, RL, and RR, respectively. The vehicle 1 according to the present embodiment is a front engine/front drive vehicle (FF vehicle), the front-wheel tires $T_{FL}$ and $T_{FR}$ are driving wheel tires, and the rear-wheel tires $T_{RL}$ and $T_{RR}$ are following wheel tires.

The control unit 2 calculates a slip ratio S indicating the ease of slipping of the tires $T_{FL}$, $T_{FR}$, $T_{RL}$, and $T_{RR}$ during traveling based on information on the rotation speeds of the tires $T_{FL}$, $T_{FR}$, $T_{RL}$, and $T_{RR}$ during traveling, and estimates the average wear state of the tires $T_{FL}$ and $T_{FR}$, which are the driving wheel tires, based on the slope of the slip ratio S with respect to the driving force F of the vehicle 1. Grooves formed in the tread portions of the tires become shallower as wear occurs. As a result, the drainage property of the tire deteriorates, hydroplaning is more likely to occur, and thus a drop in the driving performance and braking performance in rainy weather is incurred. In order to prevent such a situation from becoming serious, it is generally recommended to replace a tire when the depth of the groove of the tread portion is a predetermined threshold value or less. The control unit 2 estimates the average depth of the remaining grooves of the tires $T_{FL}$ and $T_{FR}$ as the wear state of the tires $T_{FL}$ and $T_{FR}$, detects the timing when tire replacement is recommended, and notifies the driver of the vehicle 1 of this timing.

The information on the tire wear state can be applied to various purposes other than prompting the driver of the vehicle 1 to replace a tire in a timely manner. For example, the tire wear state information can be applied to monitoring slipperiness of a road surface, controlling a braking system, and the like.

Wheel speed sensors 6 are respectively attached to the tires $T_{FL}$, $T_{FR}$, $T_{RL}$, and $T_{RR}$ (more accurately, to the wheels FL, FR, RL, and RR) of the vehicle 1, and the wheel speed sensors 6 detect rotation speeds (i.e., wheel speeds) V1 to V4 of the tires mounted on the wheels to which the wheel speed sensors 6 are attached. V1 to V4 are the rotation speeds of the tires $T_{FL}$, $T_{FR}$, $T_{RL}$, and $T_{RR}$, respectively. As the wheel speed sensor 6, any wheel speed sensor 6 can be used as long as it can detect the wheel speeds of the wheels FL, FR, RL, and RR during traveling. For example, a type of sensor that measures the wheel speed based on an output signal of an electromagnetic pickup can also be used, or a type of sensor that uses rotation to generate electricity like a dynamo and measures the wheel speed based on the voltage at this time can also be used. There is also no particular limitation on the attachment position of the wheel speed sensor 6, and the attachment position can be selected as appropriate according to the type of sensor, as long as the wheel speed can be detected. The wheel speed sensor 6 is connected to the control unit 2 via a communication wire 5. The information on the rotation speeds V1 to V4 detected by the wheel speed sensors 6 is transmitted to the control unit 2 in real time.

A torque sensor 7 that detects a wheel torque WT of the vehicle 1 is attached to the vehicle 1. There is no particular limitation on the structure and mounting position of the torque sensor 7 as long as the wheel torque WT of the vehicle 1 can be detected. The torque sensor 7 is connected to the control unit 2 via a communication wire 5. The information on the wheel torque WT detected by the torque sensor 7 is transmitted to the control unit 2 in real time, similarly to the information on the rotation speeds V1 to V4.

Figure 2:
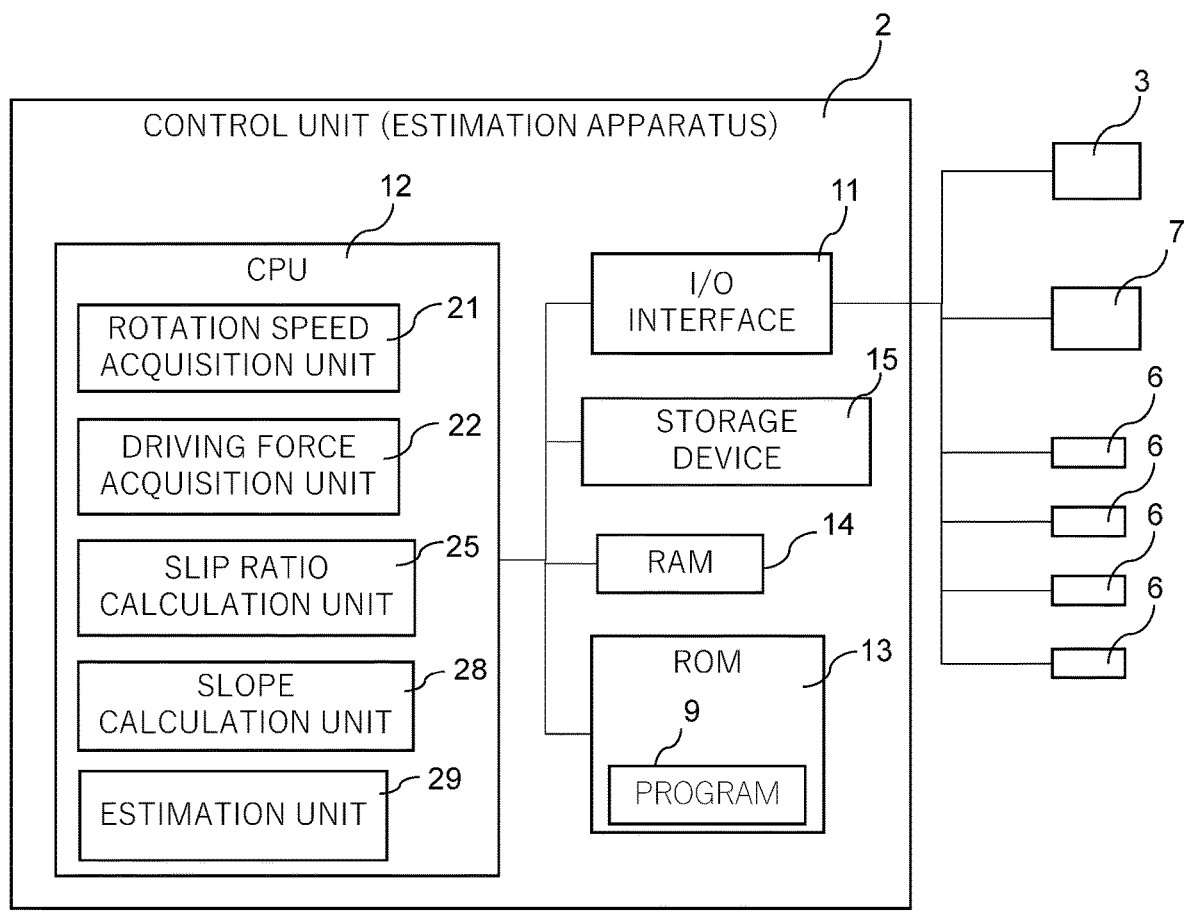
FIG. 2 is a block diagram showing an electrical configuration of the control unit according to the first embodiment.

FIG. 2 is a block diagram showing an electrical configuration of the control unit 2. The control unit 2 is mounted in the vehicle 1 and, as shown in FIG. 2, includes an I/O interface 11, a CPU (Central Processing Unit) 12, a ROM 13, a RAM 14, and a non-volatile, rewritable storage device 15. The I/O interface 11 is a communication device for performing communication with an external device such as the wheel speed sensors 6, the torque sensor 7, and a display device 3. The ROM 13 stores a program 9 for controlling the operation of each unit of the vehicle 1. By reading out the program 9 from the ROM 13 and executing it, the CPU 12 virtually operates as a rotation speed acquisition unit 21, a driving force acquisition unit 22, a slip ratio calculation unit 25, a slope calculation unit 28, and an estimation unit 29. Details of the operation of each unit will be described later. The storage device 15 is constituted by a hard disk, a flash memory, or the like. Note that the storage location of the program 9 may be the storage device 15 instead of the ROM 13. The RAM 14 and the storage device 15 are used as appropriate for the calculation of the CPU 12.

The display device 3 can output various types of information including a warning to the user (mainly the driver), and for example, can be realized in any form, such as a liquid crystal display element, a liquid crystal monitor, a plasma display, and an organic EL display. Although the mounting position of the display device 3 can be selected as appropriate, it is preferably provided at a position that is easy for the driver to understand, for example, on the instrument panel, or the like. If the control unit 2 is connected to a car navigation system, a car navigation monitor can also be used as the display device 3. If a monitor is used as the display device 3, the warning can be an icon or text information displayed on the monitor.

1-2. Wear State Estimation Processing

Figure 3:
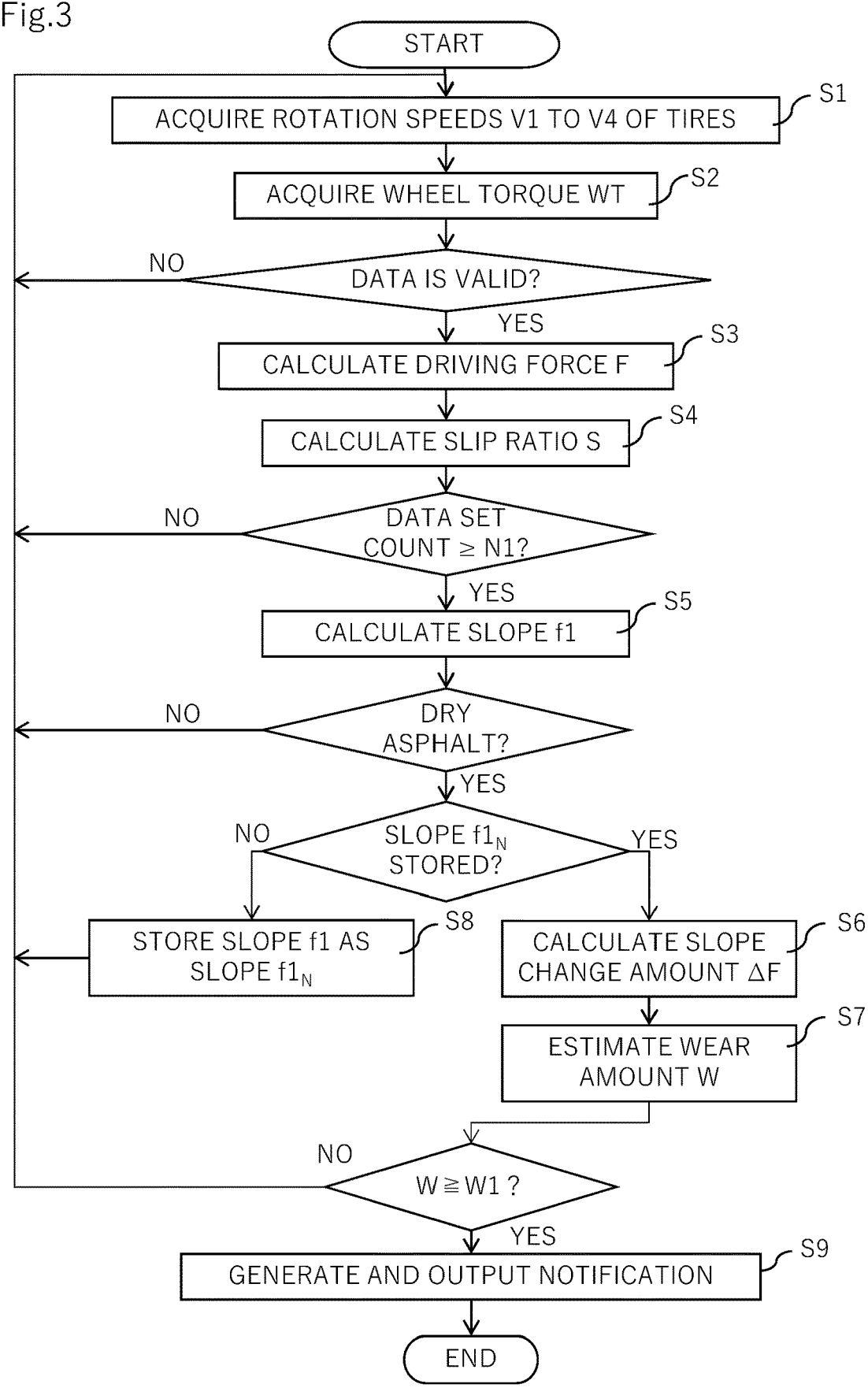
FIG. 3 is a flowchart showing a flow of wear state estimation processing according to the first embodiment.

Hereinafter, estimation processing for calculating a regression coefficient between a driving force F and a slip ratio S of the vehicle 1 and estimating the wear state of tires based on the regression coefficient will be described with reference to FIG. 3. This estimation processing may be executed repeatedly while the electric system of the vehicle 1 is turned on, or may be performed at a predetermined frequency such as once per day while the vehicle 1 is traveling.

In step S1, the rotation speed acquisition unit 21 acquires the rotation speeds V1 to V4 of the tires $T_{FL}$, $T_{FR}$, $T_{RL}$, and $T_{RR}$ while traveling. The rotation speed acquisition unit 21 receives output signals from the wheel speed sensors 6 in a predetermined sampling period, and converts these into the rotation speeds V1 to V4.

In step S2, the driving force acquisition unit 22 acquires the wheel torque WT of the vehicle 1. The driving force acquisition unit 22 receives an output signal from the torque sensor 7 in a predetermined sampling period, and converts this into a wheel torque WT.

When the data of the rotation speeds V1 to V4 and the wheel torque WT acquired in steps S1 and S2 is valid data, the processing transitions to step S3. On the other hand, when the data of the rotation speeds V1 to V4 and the wheel torque WT is not valid data, the processing returns to step S1. Valid data is data according to which the wear state can be accurately estimated in subsequent processing, and invalid data is data that can have an unfavorable effect on the estimation of the wear state. Examples of invalid data include data acquired during a brake operation of the vehicle 1. In this embodiment, the invalid data is discarded so that it is not used to estimate the wear amount.

In step S3, the driving force acquisition unit 22 calculates the driving force F of the vehicle 1 based on the converted wheel torque WT. The driving force F can be calculated, for example, by dividing the wheel torque WT by the radii of the tires $T_{FL}$, $T_{FR}$, $T_{RL}$, and $T_{RR}$.

In the next step S4, the slip ratio calculation unit 25 calculates the slip ratio S based on the rotation speeds V1 to V4. In the present embodiment, the slip ratio S is calculated as (speed of driving wheels−vehicle body speed)/vehicle body speed, and the speed of the following wheels is used as the vehicle body speed. The slip ratio S is defined as follows in the present embodiment.

$$S=\{(V1+V2)-(V3+V4)\}/(V3+V4)$$

After steps S3 and S4 are executed and before the next processing is executed, filtering for removing measurement error may be performed on the driving force F calculated in step S3 and the slip ratio S calculated in step S4.

The data of the rotation speeds V1 to V4, the slip ratio S, and the driving force F acquired in steps S1 to S4, which are executed continuously, is treated as data sets acquired at the same time or approximately the same time, and is stored in the RAM 14 or the storage device 15. As shown in FIG. 3, since steps S1 to S4 are executed repeatedly, the above data sets are sequentially acquired. After step S4, when N1 (N1≥2) such data sets are accumulated, the processing transitions to step S5.

In step S5, the slope calculation unit 28 calculates a slope f1 and an intercept f2 of the slip ratio S with respect to the driving force F as a regression coefficient representing the linear relationship between the driving force F and the slip ratio S based on a large number of data sets of the driving force F and the slip ratio S. The slope f1 and the intercept f2 can be calculated through, for example, the least squares method, or the like. The slope f1 and the intercept f2 may be calculated sequentially or through batch processing based on a large number of data sets of the driving force F and the slip ratio S. In this embodiment, the sequential least squares method is used as a preferred example.

In order to calculate an appropriate slope f1 and intercept f2, it is preferable that the data of the driving force F in a predetermined period has a certain variation or more. However, there is not much variation in the data set in a period during which the driving force F does not change much, such as a period during which the vehicle 1 is traveling downhill at a constant speed. Accordingly, at the current time, which is the time when the wear state is estimated, it is determined whether or not the variation of the driving force F is a certain value or more, and if it is determined that the variation is a certain value or more, the slope calculation unit 28 may calculate the slope f1 and the intercept f2. The variation in the driving force F can be determined by, for example, the range and variance of the driving force F acquired in the most recent predetermined period, and if these are each a predetermined threshold value or more, it is possible to determine that the variation is the certain value or more.

In the subsequent steps, the wear state of the tires $T_{FL}$, $T_{FR}$, $T_{RL}$, and $T_{RR}$ is estimated by evaluating the change in the current slope f1 with respect to an initial slope $f1_N$ obtained when the tires $T_{FL}$, $T_{FR}$, $T_{RL}$, and $T_{RR}$ are new. Hereinafter, the principle by which the wear state is estimated based on the change in the slope f1 of the driving force F with respect to the slip ratio S will be described.

Figure 4:
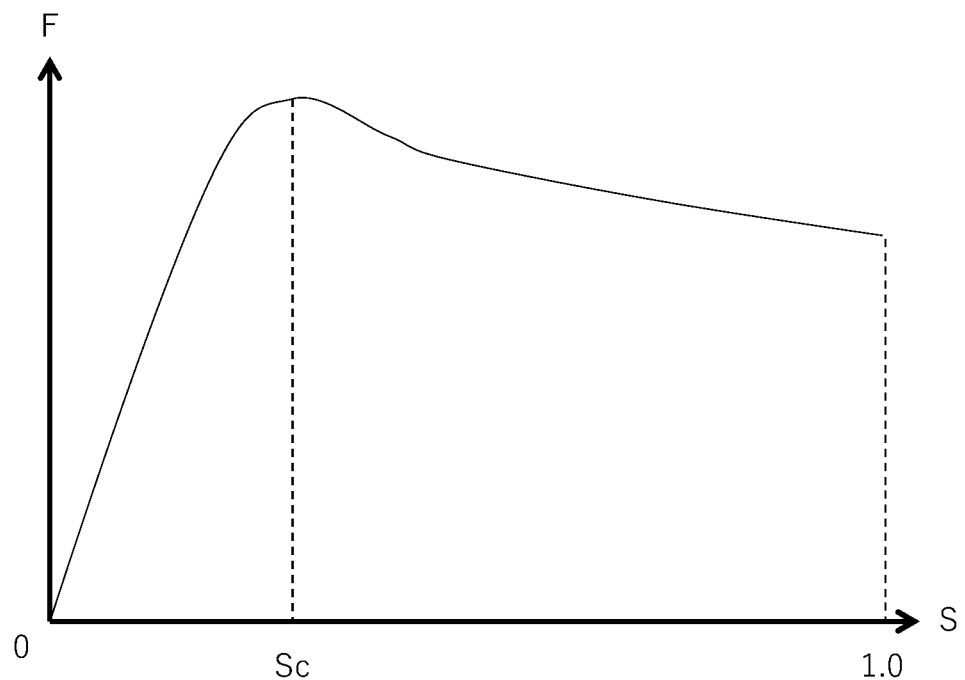
FIG. 4 is a graph showing a relationship between a slip ratio and a driving force.

In general, it is known that when the state of the road surface is constant, the relationship shown in the graph of FIG. 4 is established between the slip ratio S and the driving force F. In the graph of FIG. 4, the horizontal axis indicates the slip ratio S and the vertical axis indicates the driving force F. In the environment in which the vehicle 1 normally travels, the slip ratio S generally changes in the range of 0 to Sc. As can be understood from FIG. 4, in the region where the slip ratio S is 0 to Sc, it can be said that an approximate linear relationship is established between the slip ratio S and the driving force F. Driving stiffness C, which is represented by the following formula (1), is known as one of the factors governing the approximate linear relationship of the slip ratio S with respect to the driving force F.

$$C = w k_x l^2 / 2 \quad (1)$$

Here, w is the ground contact width of the tire, $k_x$ is the shear rigidity per unit area of the tread rubber block TB (hereinafter also referred to as "block TB") of the tire, and l is the ground contact length of the tire. The block TB is assumed to be a rectangular parallelepiped.

Figure 5:
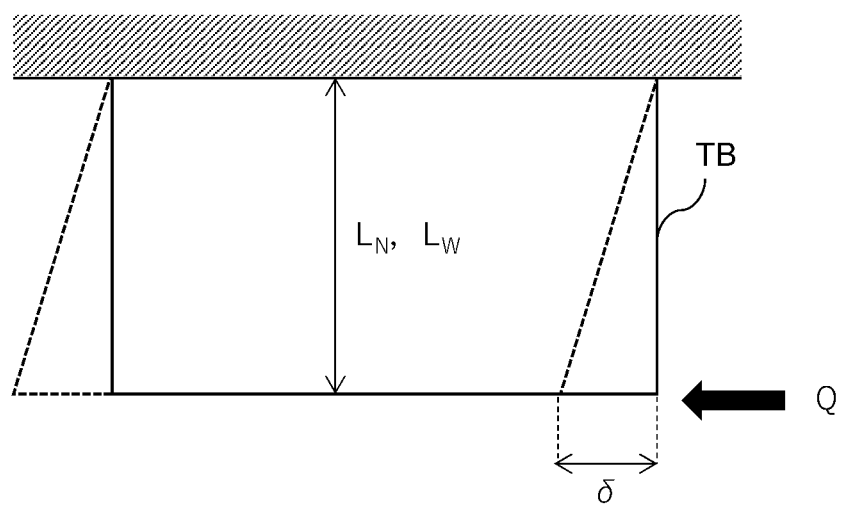
FIG. 5 is a diagram showing a mechanical model of a tread rubber block of a tire.

FIG. 5 is a model diagram in which the block TB of the tire on the road surface is considered a cantilever. The shear rigidity $k_x$ per unit area is expressed by the following formula, where the amount of deformation of the block TB when a shearing force Q acts on the block TB is δ, the height of the block TB is L, the cross-sectional area of the block TB is A, the shear elasticity coefficient of the block TB is G, and the cross-sectional shape coefficient of the block TB is κ.

$$k_x = Q/\delta = (GA)/(\kappa L)$$

Here, it is assumed that the height of the block TB when the tire is new is $L_N$, the height of the block TB when the tire is worn is $L_W$, and A and G are constant in the state of being new and the state of being worn. $k_{xW}$ is expressed by the following formula (2), where $k_x$ is $k_{xN}$ when the tire is new, and $k_x$ is $k_{xW}$ when the tire is worn.

$$k_{xW} = (GA)/(\kappa L_W) = (GA)/(\kappa L_N) \times L_N/L_W = k_{xN} \kappa L_N / L_W \quad (2)$$

Based on formula (1), it is conceivable that the slope f1 of the slip ratio S with respect to the driving force F is smaller the higher the shear rigidity $k_x$ per unit area of the block TB is. In view of this, it is assumed that the slope f1 is inversely proportional to the shear rigidity $k_x$ per unit area. Assuming that the slope, which was $f1_N$ when the tire was new, changed to f1 when the tire was worn, the following holds true based on formula (2).

$$(f1_N - f1) \propto 1/k_{xN} - 1/k_{xW} = (1/k_{xN}) \times (L_N - L_W)/L_N$$

Here, if $(L_N - L_W)$ is considered to be the amount by which the block TB has worn down from the new state due to wear and is replaced with the wear amount W, the following formula holds true.

$$(f1_N - f1) \propto W/(k_{xN} \kappa L_N)$$

This formula means that the wear amount W is proportional to the change in the slope f1. In other words, if the premise that the road surface conditions are the same when calculating the slope $f1_N$ and the slope f1 holds true, the wear amount W can be estimated based on the amount of change in the slope f1 with respect to the slope $f1_N$ in the new state. Note that the value obtained by subtracting the wear amount W from the value of the depth of the groove of the tire in the new state corresponds to the value of the depth of the remaining groove of the tire at that time.

Figure 6A:
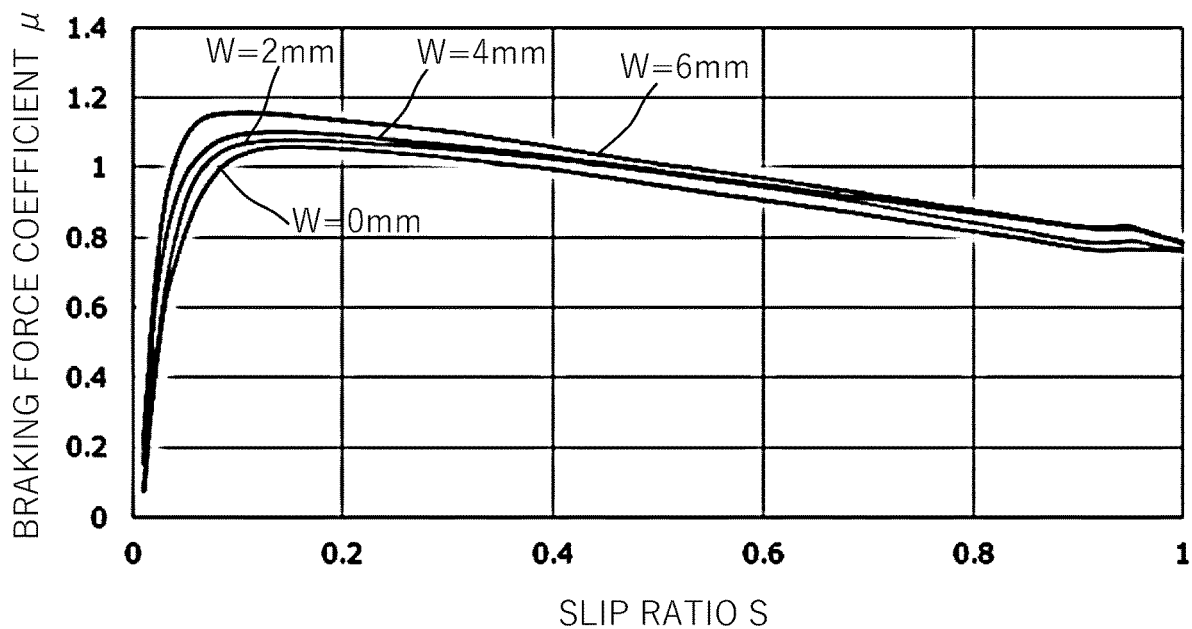
FIG. 6A is a graph obtained by plotting a braking force coefficient and slip ratio, which were obtained experimentally.
Figure 6B:
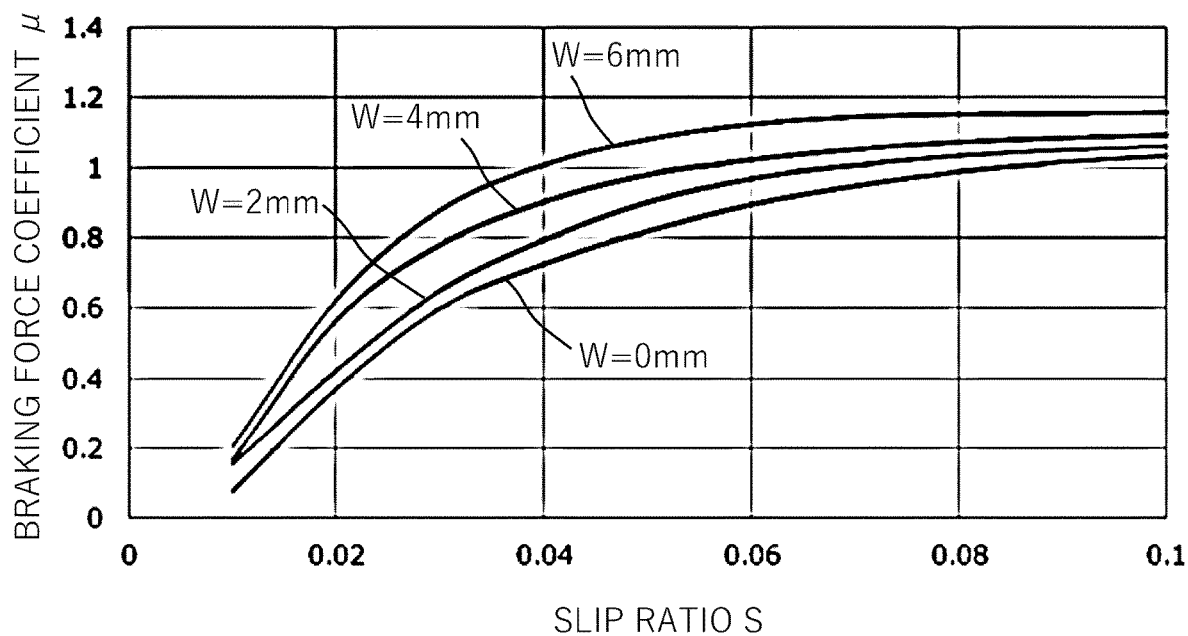
FIG. 6B is a graph obtained by plotting the braking force coefficient and slip ratio, which were obtained experimentally.

The inventor conducted a test to corroborate the above statement. FIGS. 6 to 8 are graphs showing the results of each test. First, the inventor measured the braking force coefficients μ with respect to the slip ratios S of tires using the same types of tires for which the wear amounts W are 0 mm (no wear), 2 mm, 4 mm, and 6 mm. This measurement was performed using dedicated test equipment for measuring μ-S characteristics under the condition of the same dry asphalt road surface for each tire. The results are the graphs shown in FIGS. 6A and 6B. The graph of FIG. 6B shows in detail the range in which the slip ratio S of the graph of FIG. 6A is 0 to 0.1. As can be understood from FIGS. 6A and 6B, as the wear amount W increased, the braking force coefficient μ increased with respect to the same slip ratio S. Due to this, it was confirmed that the shear rigidity $k_x$ per unit area of the block TB increases as the wear amount W increases. Then, as described above, since the slope f1 is inversely proportional to the shear rigidity $k_x$ per unit area, it is thought that the slope f1 becomes smaller as the amount of wear W increases.

Figure 7A:
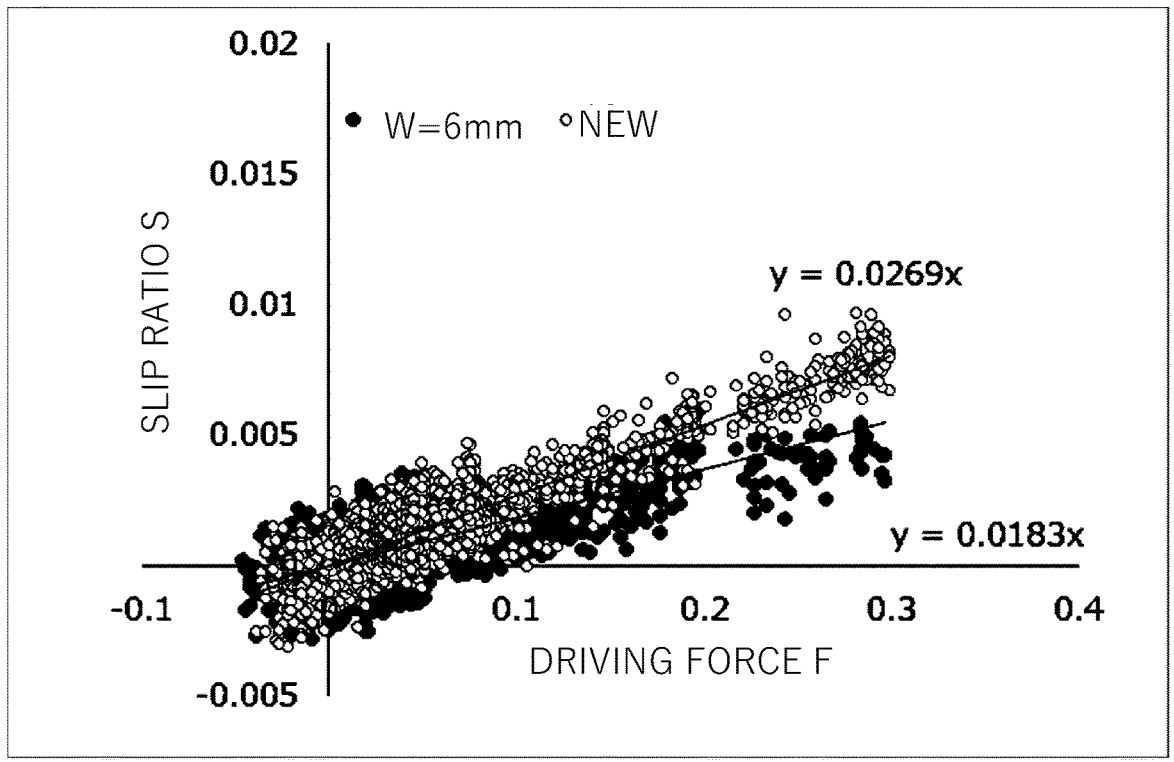
FIG. 7A is a graph obtained by plotting the driving force and slip ratio, which were obtained experimentally.
Figure 7B:
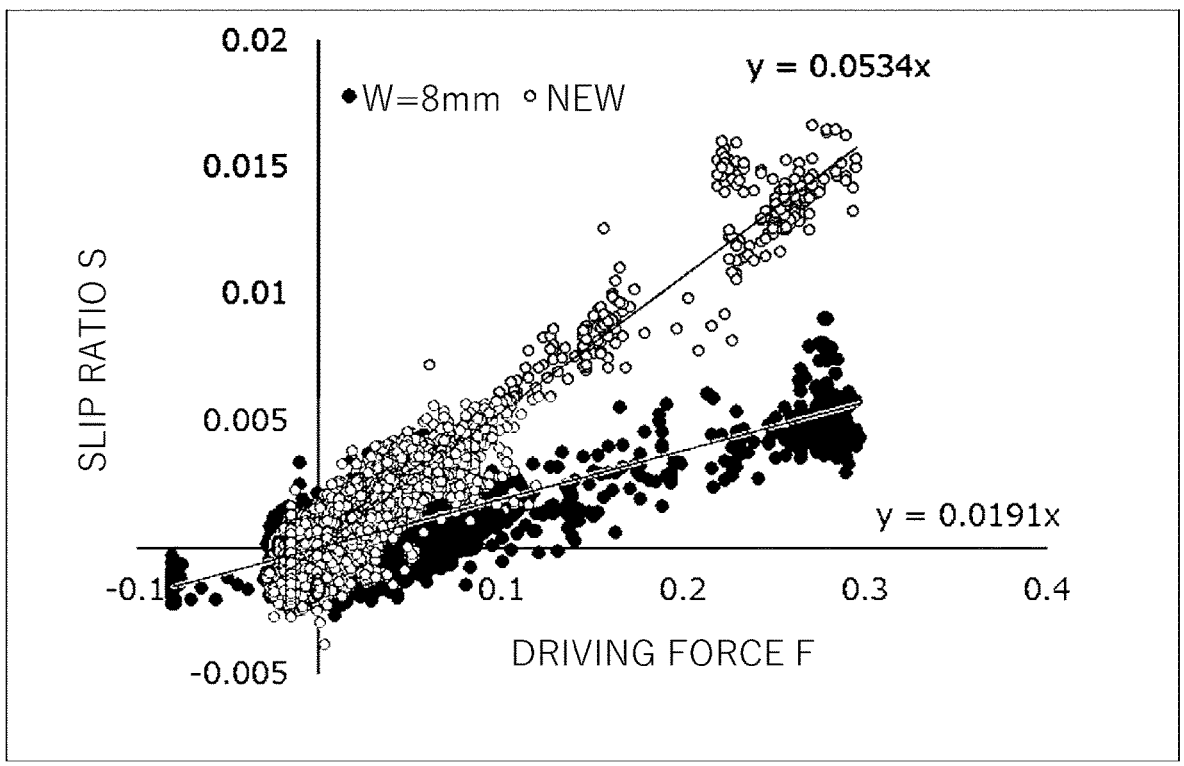
FIG. 7B is a graph obtained by plotting the driving force and slip ratio, which were obtained experimentally.
Figure 8A:
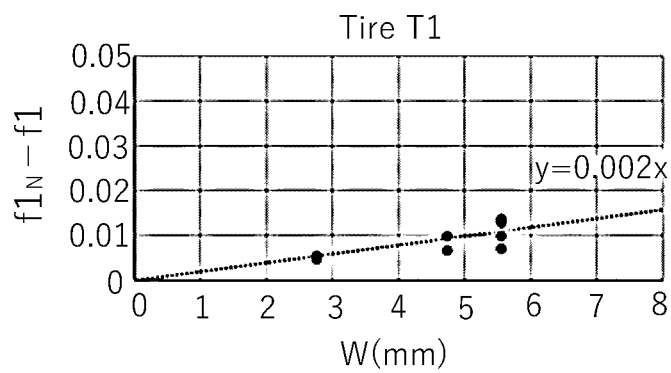
FIGS. 8A-L are graphs obtained by experimentally confirming that an amount of change in a slope is proportional to an amount of wear.
Figure 8B:
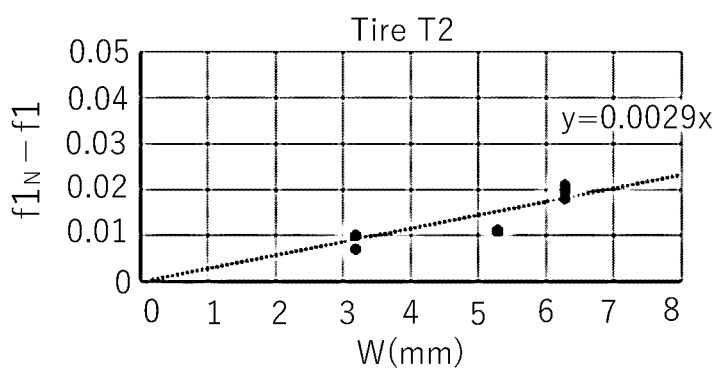
Figure 8C:
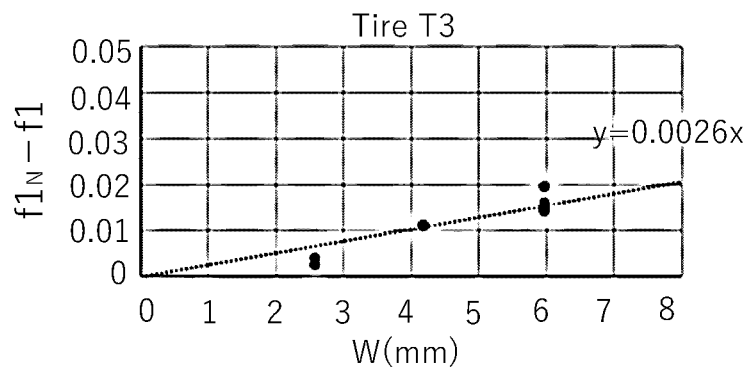
Figure 8D:
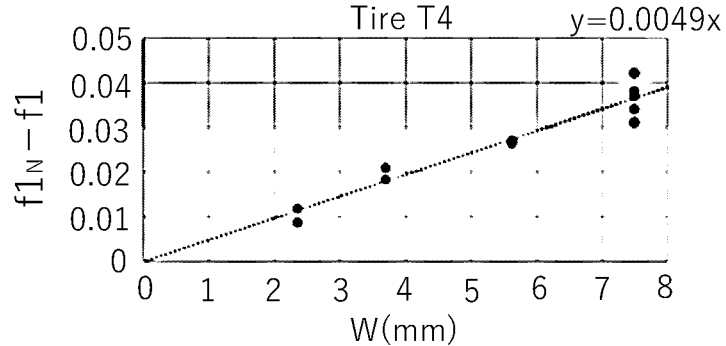
Figure 8E:
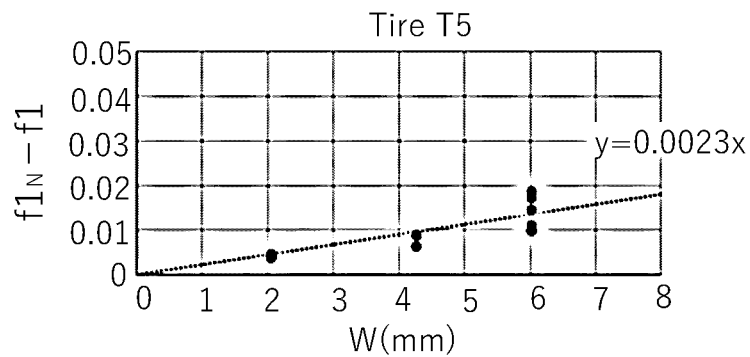
Figure 8F:
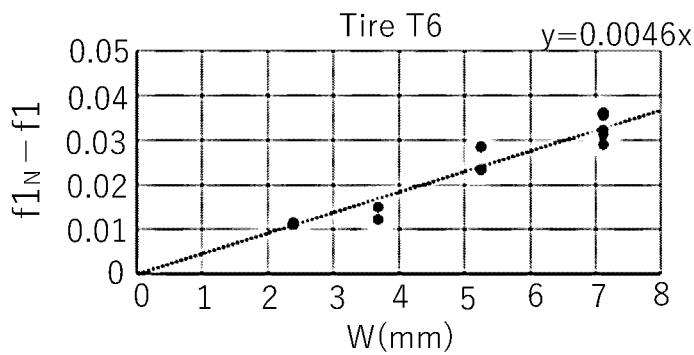
Figure 8G:
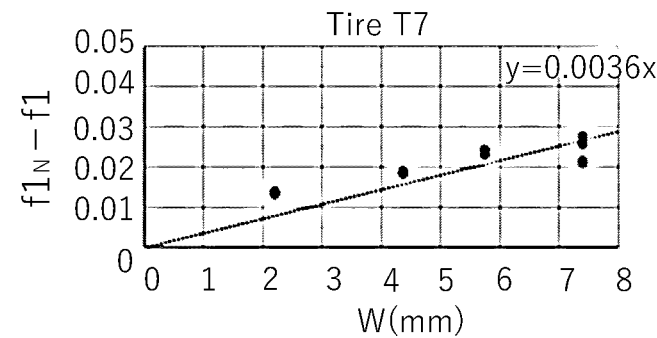
Figure 8H:
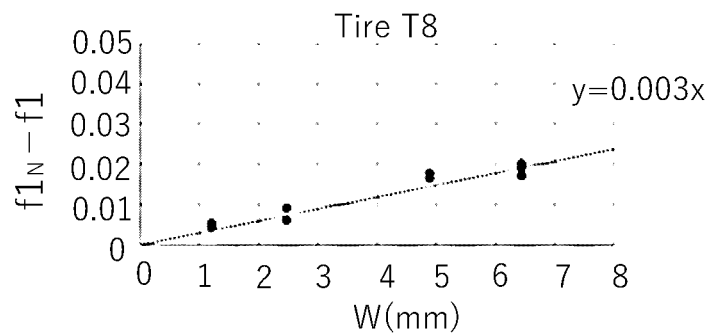
Figure 8I:
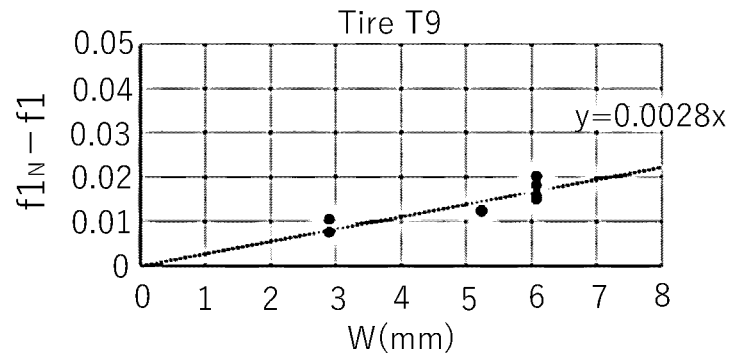
Figure 8J:
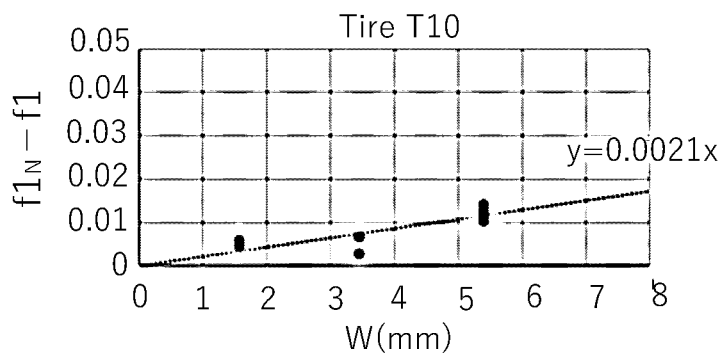
Figure 8K:
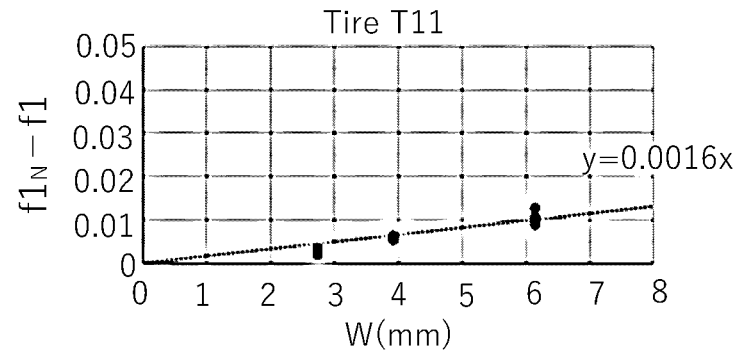
Figure 8L:
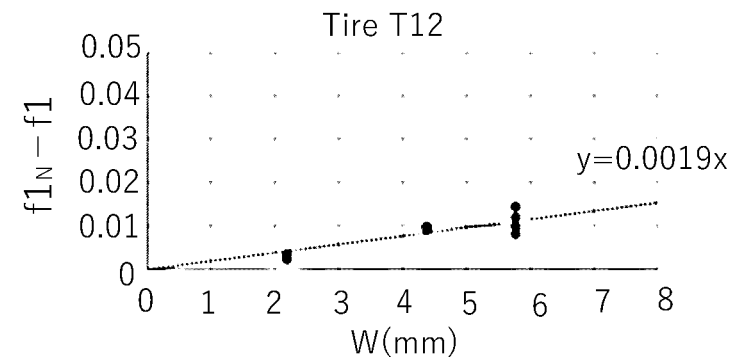

The inventor conducted a further test to prove that the slope f1 decreases as the wear amount W increases. FIGS. 7A and 7B are graphs showing the results of this test. The test was conducted by calculating the slope f1 in the case where new tires (W=0) were mounted on the four wheels of the vehicle and straight traveling was performed, and the slope f1 in the case where worn tires are mounted on the four wheels and straight traveling was performed. The same vehicle was used, and the road surface on which the vehicle traveled was the same dry asphalt road surface. The slope f1 was calculated using the same procedure as in steps S1 to S5 using the output signal of the sensor mounted on the vehicle. The graph in FIG. 7A is obtained by plotting the driving force F and the slip ratio S obtained in the case where traveling is performed with new tires, and the driving force F and the slip ratio S obtained in the case where traveling is performed with tires in the same type of wear state (W=6 mm). When the regression coefficient was calculated for each data set for the new tires and the worn tires, the slope f1 for the worn tires was 0.0183, which was smaller than the slope $f1_N$ (=0.0269) for the new tires.

The graph in FIG. 7B is obtained by plotting the driving force F and the slip ratio S obtained in the case where traveling is performed with new tires (tires of a different type from that in FIG. 7A), and the driving force F and the slip ratio S obtained in the case where traveling is performed with tires in the same type of wear state (W=8 mm). Similarly to the case of FIG. 7A, when the regression coefficient was calculated for each data set for the new tires and the worn tires, the slope f1 for the worn tires was 0.0191, which was smaller than the slope $f1_N$ (=0.0534) for the new tires.

Furthermore, the inventor calculated the slope f1 for various types of tires T1 to T12, which include size differences, in the same manner as in the test of FIGS. 7A and 7B, and confirmed the relationship of the amount of change $(f1_N - f1)$ in the slope f1 with respect to the wear amount W. The results are the graphs shown in FIGS. 8A to 8L. The horizontal axis of each graph indicates the measured wear amount W of the tires, and the vertical axis indicates the amount of change $(f1_N - f1)$ in the slope f1. As can be understood from these graphs, the amount of change $(f1_N - f1)$ in the slope f1 tends to be proportional to the wear amount W, even if the types of the tires are different. Utilizing this fact, if the slope $f1_N$ with new tires and the slope f1 with the same type of tires having a wear amount of W are acquired and the proportionality constant of the amount of change $(f1_N - f1)$ in the slope f1 with respect to the wear amount W is obtained in advance, the wear amount W can be estimated based on the amount of change $(f1_N - f1)$ in the slope f1.

With reference to FIG. 3 again, if the slope f1 calculated in step S5 does not originate in the dataset acquired while traveling on dry asphalt, then the slope f1 is not used to estimate the wear state, and the processing returns to step S1. If the slope f1 calculated in step S5 originates in a data set acquired while traveling on dry asphalt, the subsequent processing differs depending on whether the slope $f1_N$ is stored in the ROM 13 or the storage device 15. Whether or not the road surface on which the vehicle 1 travels is dry asphalt may be determined using a road surface determination algorithm in which the slope f1 is used, or using another known road surface determination algorithm. If a road surface sensor is mounted in the vehicle 1, the road surface may be determined according to an output signal of the road surface sensor.

If the tire is new and the slope $f1_N$ has not been stored in the ROM 13 or the storage device 15, the processing transitions to step S8, and the slope calculation unit 28 stores the slope f1 calculated in step S5 as the slope $f1_N$ in the ROM 13 or the storage device 15. Thereafter, the processing returns to step S1.

If the slope $f1_N$ has already been stored in the ROM 13 or the storage device 15, in step S6, the estimation unit 29 calculates the amount of change ΔF in the slope f1 from the state of being new. In this embodiment, the amount of change ΔF is defined by the following formula.

$$\Delta F = f1_N - f1$$

In step S7, the estimation unit 29 estimates the wear amount W. The estimation unit 29 converts the amount of change ΔF into the wear amount W based on a function for the amount of change ΔF with respect to the wear amount W, which was specified in advance through a test or simulation and stored in the ROM 13 or the storage device 15. The function for the amount of change ΔF with respect to the wear amount W may be specified for each type of tire and be stored in the ROM 13 or the storage device 15. In this case, the estimation unit 29 may also be configured to acquire information on the type of the tires mounted on the vehicle 1 and estimate the wear amount W by reading out the formula appropriate for the tire from the ROM 13 or the storage device 15. Alternatively, a representative function determined regardless of the type of tire may be stored in the ROM 13 or the storage device 15 as the function for the amount of change ΔF with respect to the wear amount W, and the estimation unit 29 may estimate the wear amount W based on this function.

When the wear amount W estimated in step S7 is at least a predetermined threshold value W1, which is determined in advance as a guideline for tire replacement, the processing transitions to step S9. In step S9, the estimation unit 29 generates a signal for performing notification of the tire wear, and displays the notification to the driver via the display device 3. The content of the notification displayed on the display device 3 may include, for example, the fact that the tire has worn by a reference value or more, that slipping is likely to occur, that replacement of the tire is prompted, and the like. There is no particular limitation on the mode of notification, and a message based on text information, illumination of an icon, display of a graphic, and the like can be appropriately selected thereas. Also, a notification including the same content may be output through audio via a speaker of the vehicle 1.

2. Second Embodiment

Hereinafter, a wear state estimation apparatus, method, and program according to a second embodiment of the present invention will be described. Hereinafter, configurations and processing procedures (steps) that are different from those of the first embodiment will be mainly described, and configurations and steps common to the first embodiment will be denoted by the same reference numerals thereas and description thereof will be omitted.

2-1. Configuration of Estimation Apparatus

Figure 9:
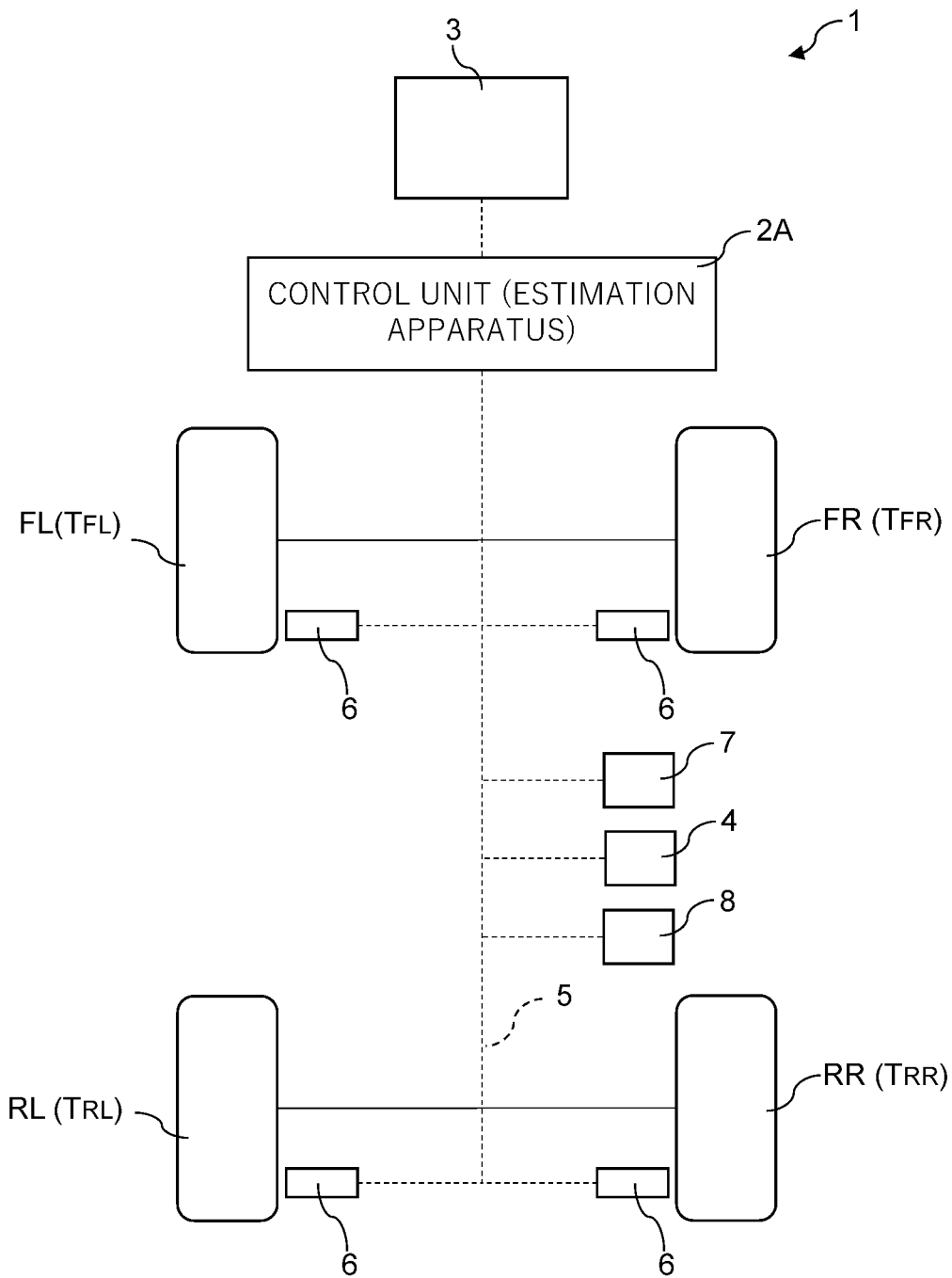
FIG. 9 is a schematic view showing a state in which a control unit serving as an estimation apparatus according to a second embodiment is mounted on a vehicle.
Figure 10:
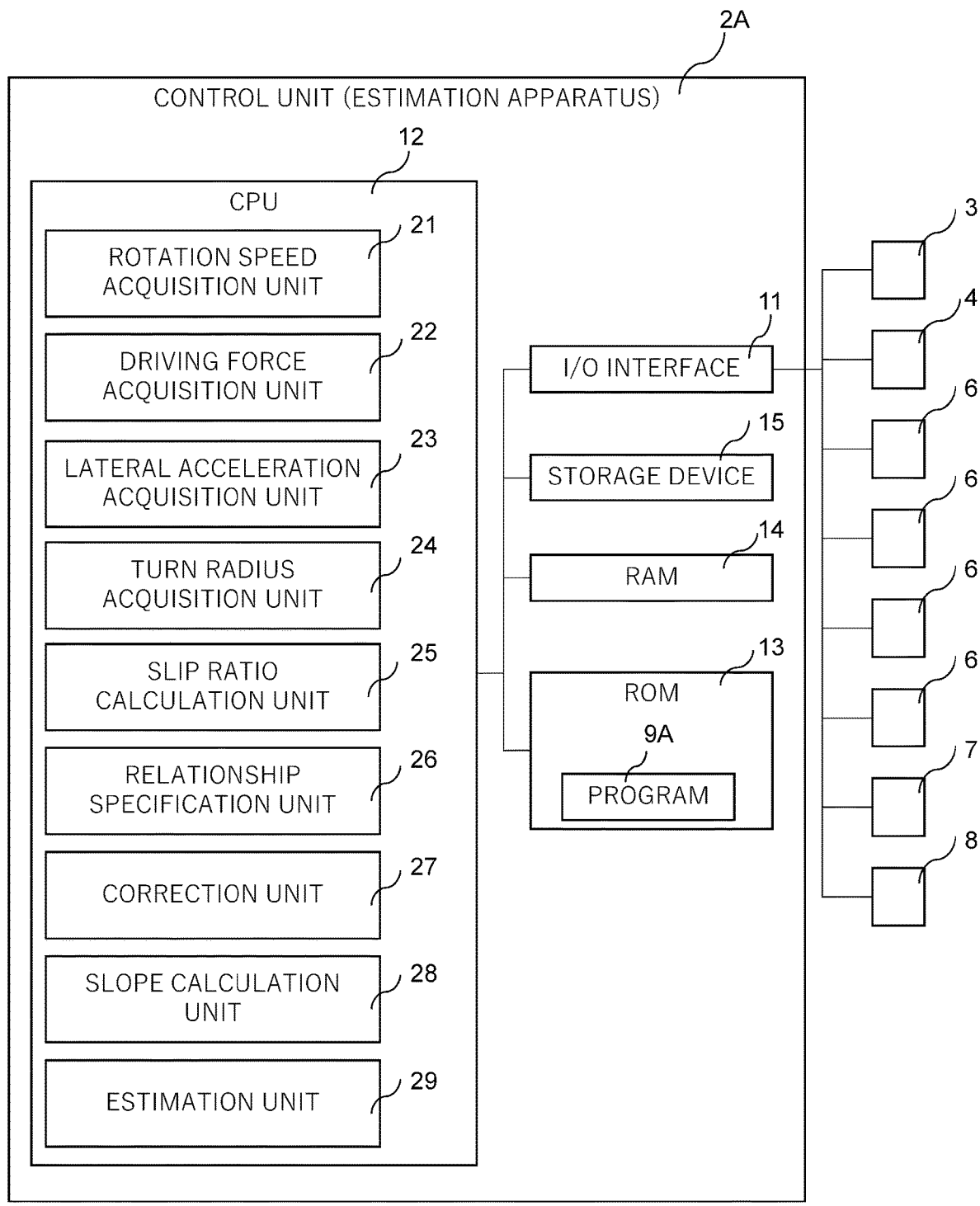
FIG. 10 is a block diagram showing an electrical configuration of the control unit according to the second embodiment.

FIG. 9 is a schematic view showing a state in which a control unit 2A serving as the estimation apparatus according to the second embodiment is mounted on the vehicle 1, and FIG. 10 is a block diagram showing an electrical configuration of the control unit 2A. In the control unit 2A, change in the slip ratio S resulting from the vehicle 1 performing a turn is taken into consideration when calculating the slip ratio S. This is because the relationship of the slip ratio S with respect to the driving force F changes when the vehicle 1 performs a turn, and therefore the accuracy of estimating the wear state based on the slope f1 may decrease.

A lateral acceleration sensor 4 that detects lateral acceleration γ applied to the vehicle 1 is attached to the vehicle 1. The lateral acceleration γ is centrifugal acceleration that acts on the vehicle 1 toward the outside of the turn when the vehicle 1 performs a turn. There is no particular limitation on the structure and attachment position of the lateral acceleration sensor 4, as long as the lateral acceleration γ can be detected. The lateral acceleration sensor 4 is connected to the control unit 2 via a communication wire 5. The information on the lateral acceleration γ detected by the lateral acceleration sensor 4 is transmitted to the control unit 2A in real time, similarly to the information on the rotational speeds V1 to V4 and the wheel torque WT.

Also, a yaw rate sensor 8 that detects a yaw rate ω of the vehicle 1 is attached to the vehicle 1. The yaw rate ω is the rotational angular velocity about a vertical axis when the vehicle 1 performs a turn. As the yaw rate sensor 8, for example, a type of sensor that detects the yaw rate by using the Coriolis force can be used, but there is no particular limitation on the structure and the attachment position thereof as long as the yaw rate ω can be detected. The yaw rate sensor 8 is connected to the control unit 2 via the communication wire 5. The information on the yaw rate ω detected by the yaw rate sensor 8 is transmitted to the control unit 2A in real time, similarly to the information on the rotational speeds V1 to V4, the wheel torque WT, and the lateral acceleration γ.

As shown in FIG. 10, the ROM 13 of the control unit 2A stores a program 9A for controlling the operation of each unit of the vehicle 1. By reading out the program 9A from the ROM 13 and executing it, the CPU 12 virtually operates as a rotation speed acquisition unit 21, a driving force acquisition unit 22, a slip ratio calculation unit 25, a slope calculation unit 28, and an estimation unit 29, and further operates as a lateral acceleration acquisition unit 23, a turn radius acquisition unit 24, a relationship specification unit 26, and a correction unit 27. The correction unit 27 is an example of the first correction unit and the second correction unit of the present invention. Details of the operation of each unit will be described later.

2-2. Wear State Estimation Processing

Hereinafter, wear state estimation processing performed by the control unit 2A will be described with reference to the drawings. This estimation processing may be executed repeatedly while the electric system of the vehicle 1 is turned on, or may be performed at a predetermined frequency such as once per day while the vehicle 1 is traveling.

In step S21, the same processing as in step S1 of the estimation processing according to the first embodiment is performed. That is, the rotation speeds V1 to V4 are acquired. Also, in step S22, the same processing as in step S2 of the estimation processing according to the first embodiment is performed. That is, the wheel torque WT is acquired.

In step S23, the lateral acceleration acquisition unit 23 acquires the lateral acceleration γ applied to the vehicle 1. The lateral acceleration acquisition unit 23 receives the output signal from the lateral acceleration sensor 4 in a predetermined sampling period, and converts this into the lateral acceleration γ.

In step S24, the turn radius acquisition unit 24 acquires the yaw rate ω of the vehicle 1. The turn radius acquisition unit 24 receives an output signal from the yaw rate sensor 8 in a predetermined sampling period, and converts this into the yaw rate ω. The turn radius acquisition unit 24 acquires the turn radius R of the vehicle 1 by dividing the vehicle body speed by the yaw rate ω. Since the vehicle body speed can be approximated using the speed of the following wheel, it can be calculated as, for example, $$R=(V3+V4)/2\omega.$$

In the next step S25, the same processing as in step S3 of the estimation processing according to the first embodiment is performed. That is, the driving force acquisition unit 22 calculates the driving force F of the vehicle 1 based on the converted wheel torque WT.

In step S26, the slip ratio calculation unit 25 calculates the slip ratio S based on the rotation speeds V1 to V4.

After both the driving force F and the slip ratio S are calculated in step S25 and step S26, before transitioning to the following processing, filtering for removing measurement error may be performed on the driving force F calculated in step S25 and the slip ratio S calculated in step S26.

The data of the rotation speeds V1 to V4, the wheel torque WT, the lateral acceleration γ, the yaw rate ω, the turn radius R, the slip ratio S, and the driving force F acquired in steps S21 to S26, which are executed continuously, is treated as data sets acquired at the same time or approximately the same time, and is stored in the RAM 14 or the storage device 15. As shown in FIG. 11, since steps S21 to S26 are repeatedly executed, the above-described data sets are sequentially acquired. After step S26, when N1 (N1≥2) such data sets are accumulated, the processing transitions to step S27. Step S27 and step S28 that follows thereafter are performed only once. After steps S27 and S28 are executed once, after steps S21 to S26, the processing transitions to step S29.

In step S27, the relationship specification unit 26 specifies first relationship information indicating the relationship between the turn radius R and the slip ratio S based on a large number of data sets of the turn radius R calculated in step S24 and the slip ratio S. The first relationship information is used for the subsequent correction of the slip ratio S (step S29). While the vehicle 1 is performing a turn, even if the vehicle 1 is traveling on a road surface in the same state, the linear relationship between the slip ratio S and the driving force F changes compared to when the vehicle 1 travels straight, and therefore the wear state may no longer be able to be estimated correctly. This is because during a turn, a track difference (route difference) occurs between the left and right tires, and the slip ratio S changes from the time of straight traveling due to the influence of this track difference. Therefore, here, in order to realize various types of stable control based on the slip ratio S, the influence caused by the difference between the left and right tracks during a turn is canceled from the slip ratio S.

Figure 12A:
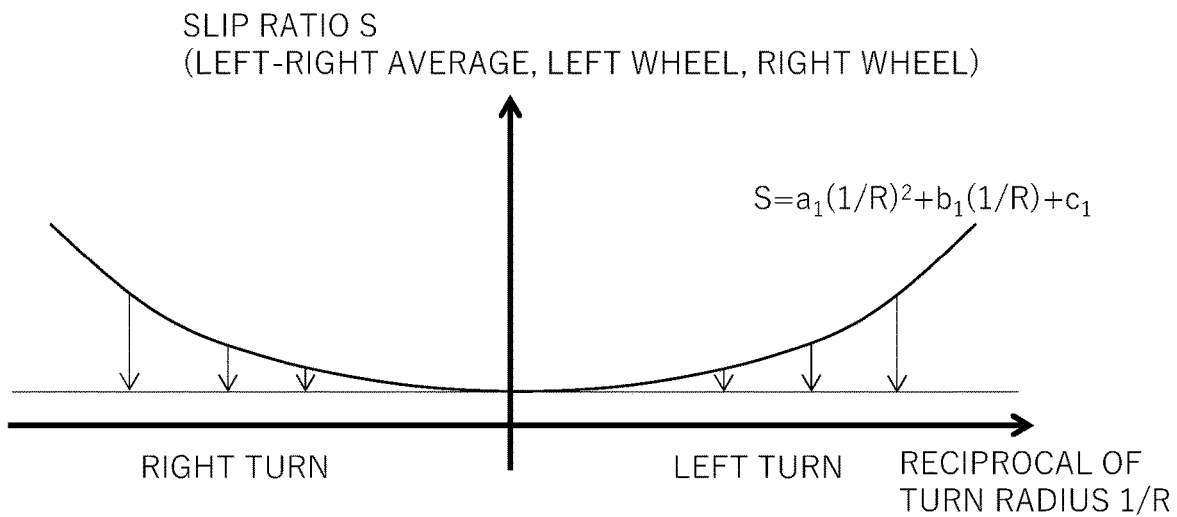
FIG. 12A is a graph showing a relationship between a slip ratio and a turn radius of a vehicle.

The difference between the left and right tracks during a turn depends on the turn radius R, and a certain relationship is established between the turn radius R and the slip ratio S. According to the test conducted by the inventor, the slip ratio S is generally represented by a quadratic function of the reciprocal of the turn radius R, as shown in FIG. 12A. In step S7, the relationship specification unit 26 specifies coefficients $a_1$, $b_1$ and $c_1$ in the following formula as the relationship information representing the relationship between the turn radius R and the slip ratio S.

$$S=a_1(1/R)^2+b_1(1/R)+c_1$$

The coefficients $a_1$, $b_1$ and $c_1$ are calculated based on a large number of data sets of the slip ratio S and the turn radius R stored in the RAM 14 or the storage device 15, and are calculated through, for example, a method such as the least squares method.

Note that the apex of a parabola representing the relationship between the reciprocal of the turn radius R and the slip ratio S corresponds to the time of straight traveling, and as shown in FIG. 12A, generally overlaps with the vertical axis representing the slip ratio S. In other words, $b_1$ is approximately 0. Accordingly, here, only the coefficients $a_1$ and $c_1$ can be specified as the relationship information according to the following formula.

$$S=a_1(1/R)^2+c_1$$

In the next step S28, the relationship specification unit 26 specifies second relationship information that represents the relationship between the lateral acceleration γ, the driving force F, and the slip ratio S based on a large number of data sets of the lateral acceleration γ acquired in step S23 and the slip ratio S and driving force F. The second relationship information is also used for the subsequent correction of the slip ratio S (step S30). As described above, since the linear relationship between the slip ratio S and the driving force F changes while the vehicle 1 is performing a turn, it may not be possible to accurately estimate the wear state. Also, during a turn, this linear relationship changes from the time of straight traveling not only due to the difference between the left and right tracks but also due to the influence of load movement in the left-right direction of the vehicle body. This is because the slip ratio S changes from the time of traveling straight due to the influence of such load movement as well. Accordingly, here, in order to realize various types of stable control based on the slip ratio S, the influence that occurs due to the load movement in the left-right direction during a turn is canceled from the slip ratio S.

Figure 12B:
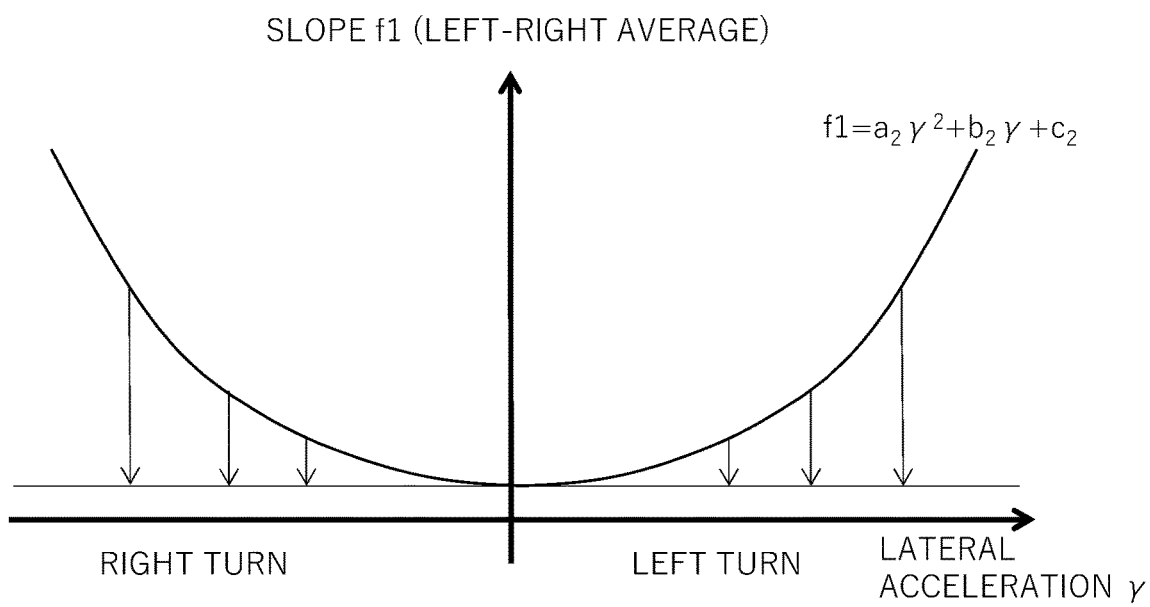
FIG. 12B is a graph showing a relationship between the slope of the slip ratio with respect to the driving force, and lateral acceleration.

The load movement in the left-right direction during a turn depends on the lateral acceleration γ, and a certain relationship is established between the lateral acceleration γ and the slope f1 of the slip ratio S with respect to the driving force F. According to the test conducted by the inventor, the slope f1 is generally represented by a quadratic function of the lateral acceleration γ as shown in FIG. 12B. In step S28, the relationship specification unit 26 specifies coefficients $a_2$, $b_2$, and $c_2$ and f2 in the following formula as the relationship information representing the relationship between the lateral acceleration γ, the driving force F, and the slip ratio S. Note that f2 is the intercept of the slip ratio S with respect to the driving force F.

$$S=f1F+f2=(a_2\gamma^2+b_2\gamma+c_2)F+f2$$

The coefficients $a_2$, $b_2$, and $c_2$ and f2 are calculated based on a large number of data sets of the slip ratio S and the driving force F and lateral acceleration γ, and are calculated through, for example, a method such as the least squares method. Also, the range of the lateral acceleration γ is divided into appropriate ranges, a first-order regression of the slip ratio S and the driving force F is performed in each range, the regression coefficients f1 and f2 are calculated, and thereafter the average value of the lateral acceleration γ and the average value of the slope f1 can be calculated in each range, and the coefficients $a_2$, $b_2$, and $c_2$ can be specified using a Gaussian elimination method based on these average values.

When step S28 ends, the processing returns to step S21, and steps S21 to S26 are repeated again. As shown in FIG. 11, after steps S27 and S28 are executed once and the relationship information $a_1$, $b_1$ and $c_1$ between the turn radius R and the slip ratio S and the relationship information $a_2$, $b_2$, and $c_2$ between the lateral acceleration γ, the driving force F, and the slip ratio S are specified, each time steps S21 to S26 are each executed once, steps S29 to S35 are repeatedly executed thereafter.

In step S29, the correction unit 27 corrects the slip ratio S obtained in the most recent step S26 based on the relationship information $a_1$, $b_1$ and $c_1$ indicating the relationship between the turn radius R and the slip ratio S, and the turn radius R acquired in the most recent step S24. As described above, the slip ratio S is represented by a quadratic function of the reciprocal of the turn radius R. Accordingly, the correction unit 27 corrects the slip ratio S by subtracting the value obtained by multiplying the square of the reciprocal of the turn radius R at the time of correction by the coefficient $a_1$ from the slip ratio S, in accordance with the following formula.

$$S=S-a_1(1/R)^2$$

Note that the slip ratio S may be corrected by further subtracting the value obtained by multiplying the reciprocal of the turn radius R at the time of correction by the coefficient $b_1$ from the slip ratio S, in accordance with the following formula.

$$S=S-a_1(1/R)^2-b_1(1/R)$$

According to the above correction formula, as shown in FIG. 12A, it is possible to calculate the slip ratio S converted when (1/R)=0 is substantially satisfied, that is, when traveling straight, and thus the influence of the track difference caused by performing a left turn and a right turn is canceled from the slip ratio S.

In the next step S30, the correction unit 27 further corrects the slip ratio S acquired in step S26 based on the relationship information $a_2$, $b_2$ and $c_2$ indicating the relationship between the lateral acceleration γ and the slip ratio S, the lateral acceleration γ acquired in the most recent step S23, and the driving force F acquired in the most recent step S25. As described above, the slip ratio S is represented by a linear function of the driving force F whose slope is f1, and the slope f1 is represented by a quadratic function of the lateral acceleration γ. Thus, according to the following formula, the correction unit 27 further corrects the slip ratio S by calculating the sum of the value obtained by multiplying the square of the lateral acceleration γ at the time of correction by the coefficient $a_2$, the value obtained by multiplying the lateral acceleration γ at the time of correction by the coefficient $b_2$, and $c_2$, calculating the product of that sum and the driving force F at the time of correction, and subtracting that product from the slip ratio S acquired in step S29.

$$S=S-f1F=S-(a_2γ^2+b_2γ+c_2)F$$

Note that since $b_2$ is also approximately 0, the slip ratio S may also be corrected according to the following formula.

$$S=S-(a_2γ^2+c_2)F$$

According to the above correction formula, the slip ratio S converted when traveling straight can be calculated, and the influence of the load movement in the left-right direction due to performing a left turn and a right turn is canceled from the slip ratio S.

In the subsequent steps S31 to S33, the tire wear amount W is estimated based on the amount of change ΔF in the slope f1 of the driving force F with respect to the slip ratio S corrected as described above, with respect to the initial slope $f1_N$.

In step S31, the slope calculation unit 28 calculates the regression coefficients f1 and f2 that represent the linear relationship between the slip ratio S and the driving force F indicated by the following formula, based on a large number of data sets of the slip ratio S and the driving force F at the current time, which is the time of wear state estimation, and in a predetermined period prior to the current time. The method for calculating the regression coefficients f1 and f2 is the same as that of the first embodiment.

$$S=f1F+f2$$

The subsequent processing is the same as the processing of step S5 and onward of the first embodiment. That is, step S31 corresponds to step S5 of the first embodiment, step S32 corresponds to step S6 of the first embodiment, step S33 corresponds to step S7 of the first embodiment, step S34 corresponds to step S8 of the first embodiment, and step S35 corresponds to step S9 of the first embodiment.

According to the wear amount estimation processing according to the second embodiment, the slope f1 is calculated based on the slip ratio S from which the influence of turning has been canceled. For this reason, the data obtained while the vehicle 1 is performing a turn can also be suitably used for estimating the amount of wear.

3. Variations

Although several embodiments of the present invention have been described above, the present invention is not limited to the above-described embodiments, and various modifications can be made without departing from the spirit of the present invention. For example, the following modifications can be made. Also, the gists of the following variations can be combined as appropriate.

3-1

The estimation of the tire wear state according to the above-described embodiment can also be applied to a rear-wheel drive vehicle, and can also be applied to a four-wheel drive vehicle. Furthermore, the same functions can be applied as appropriate not only to a four-wheeled vehicle, but also to a three-wheeled vehicle or a six-wheeled vehicle. If the estimation of the tire wear state according to the above-described embodiment is applied to a rear-wheel drive vehicle, the average wear amount of the tires mounted on the rear wheels, which are the driving wheels, is estimated.

3-2

The method for acquiring the lateral acceleration γ of the vehicle 1 is not limited to that described in the embodiments above. For example, the lateral acceleration γ can be obtained also based on the information on the yaw rate ω from the yaw rate sensor 8 and the rotation speeds V1 to V4.

3-3

In the above-described embodiments, the method for calculating the vehicle body speed, which is used to calculate the slip ratio S, the turn radius R, and the like, is not limited to that described in the embodiments above. For example, the slip ratio S, the turn radius R, and the like may also be calculated using the value obtained by integrating an acceleration α acquired by an acceleration sensor attached to the vehicle 1 as the vehicle body speed. The vehicle body speed may also be calculated based on a positioning signal of a satellite positioning system such as GPS (Global Positioning System), which communicates with and is connected to the vehicle 1, and the vehicle body speed may be used to calculate the slip ratio S, the turn radius R, and the like.

3-4

The method for acquiring the driving force F is not limited to that described in the embodiments above. For example, the acceleration of the vehicle 1 acquired by the acceleration sensor attached to the vehicle 1 can also be treated as the driving force F, the driving force F can also be derived from the engine torque and the engine rotation speed acquired from a control device of the engine of the vehicle 1, and the driving force F can also be derived from the rotation speeds V1 to V4 of the tires.

3-5

As the method for canceling the influence of the load movement that occurs while the vehicle is performing a turn from the slip ratio S, it is also possible to use a method of calculating the slip ratio S based on any one of the following formulas (3) to (5) according to the lateral acceleration $\gamma$, instead of the method of correcting the slip ratio S based on the relationship information $a_2$, $b_2$ and $c_2$, the lateral acceleration $\gamma$, and the driving force F. Formula (3) is a formula for calculating the slip ratio S based only on the rotation speed of the left tire, formula (4) is a formula for calculating the slip ratio S based only on the rotation speed of the right tire, and formula (5) is a formula for calculating the slip ratio S based on the average of the rotation speeds of the left and right tires.

$$S=(V1-V3)/V3 \tag{3}$$

$$S=(V2-V4)/V4 \tag{4}$$

$$S=\{(V1+V2)-(V3+V4)\}/(V3+V4) \tag{5}$$

Hereinafter, for the sake of convenience in the description, the slip ratio S calculated using formula (3) will be referred to as a first slip ratio S, the slip ratio S calculated using formula (4) will be referred to as a second slip ratio S, and the slip ratio S calculated using formula (5) will be referred to as a third slip ratio S.

The slip ratio calculation unit 25 can select any one of formulas (3) to (5) according to the most recent lateral acceleration $\gamma$ acquired by the lateral acceleration acquisition unit 23, and can calculate any of the first to third slip ratios S based on the selected formula. More specifically, the slip ratio calculation unit 25 can calculate the first slip ratio S when the vehicle 1 performs a right turn, the second slip ratio S when the vehicle 1 performs a left turn, and the third slip ratio S when the vehicle 1 travels straight. At this time, for example, when $-A \leq \gamma \leq A$ is satisfied, it can be determined that the vehicle is traveling straight, when $\gamma < -A$ is satisfied, it can be determined that the vehicle is performing a right turn, and when $A < \gamma$ is satisfied, it can be determined that the vehicle is performing a left turn. A is a threshold value that takes a predetermined positive value.

Figure 13:
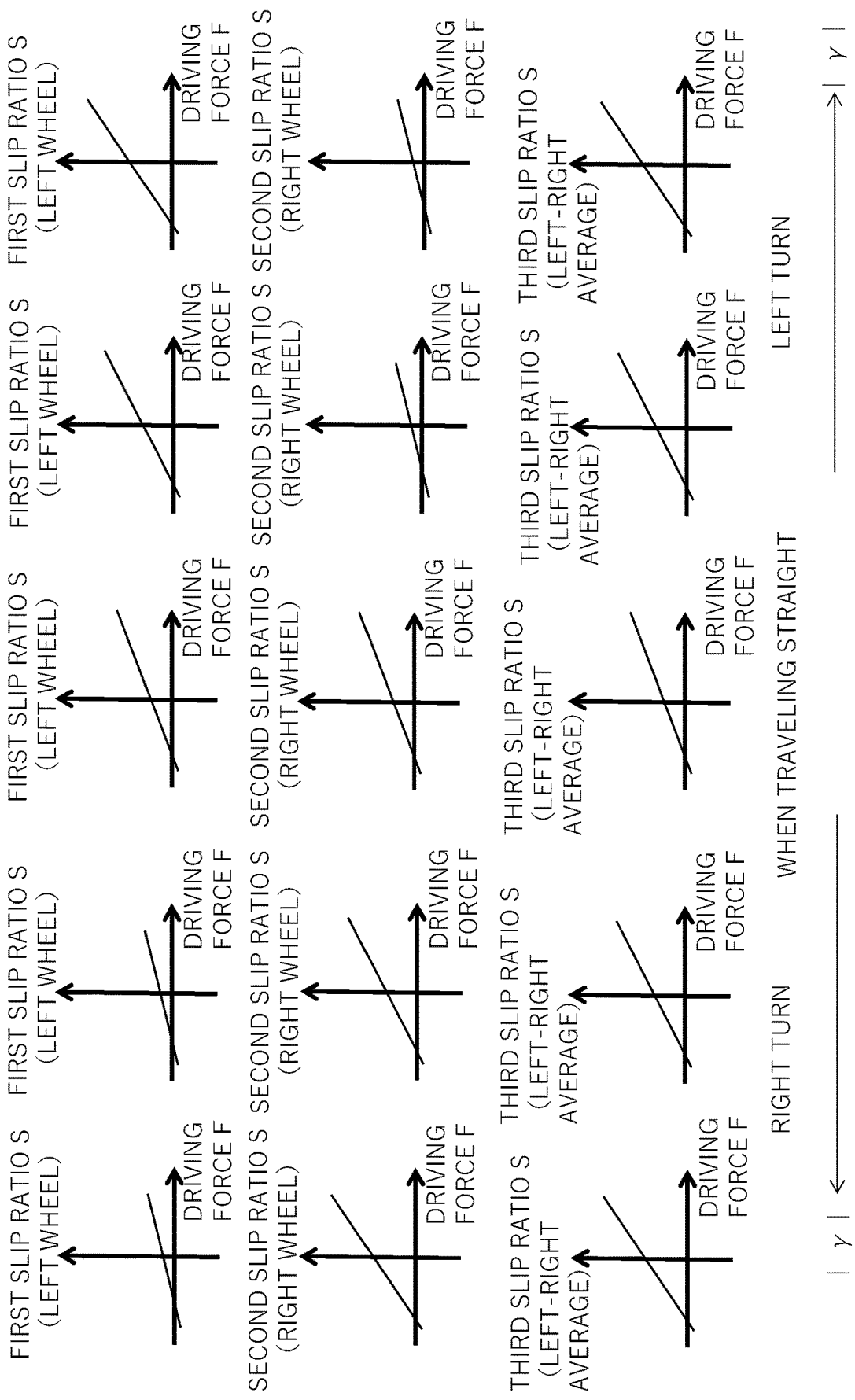
FIG. 13 is a graph showing a relationship between various slip ratios and the driving force when traveling straight, when performing a left turn, and when performing a right turn.
Figure 14A:
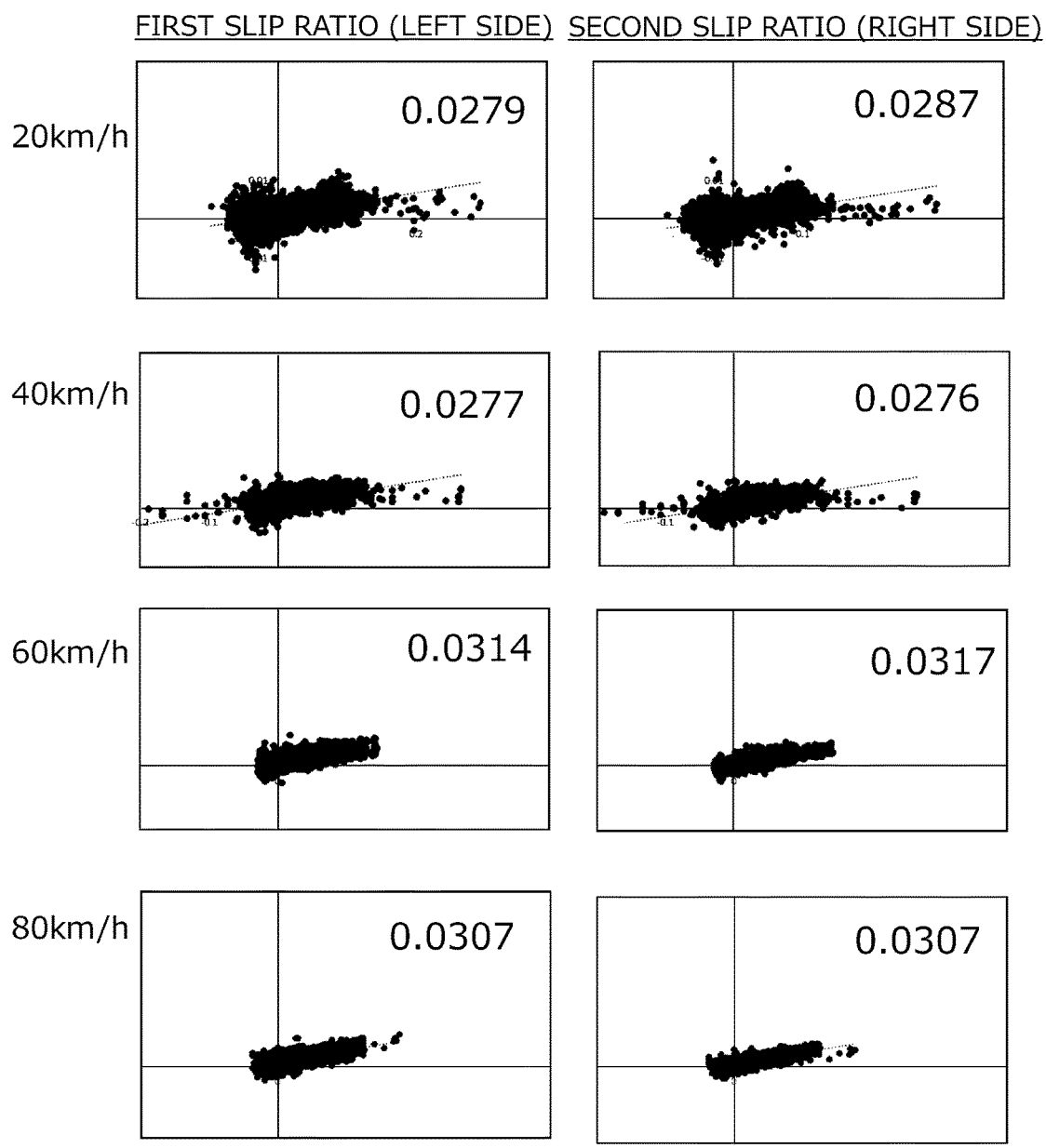
FIG. 14A is a graph showing a relationship between the first slip ratio and second slip ratio and the driving force with respect to various vehicle speeds when traveling straight.
Figure 14B:
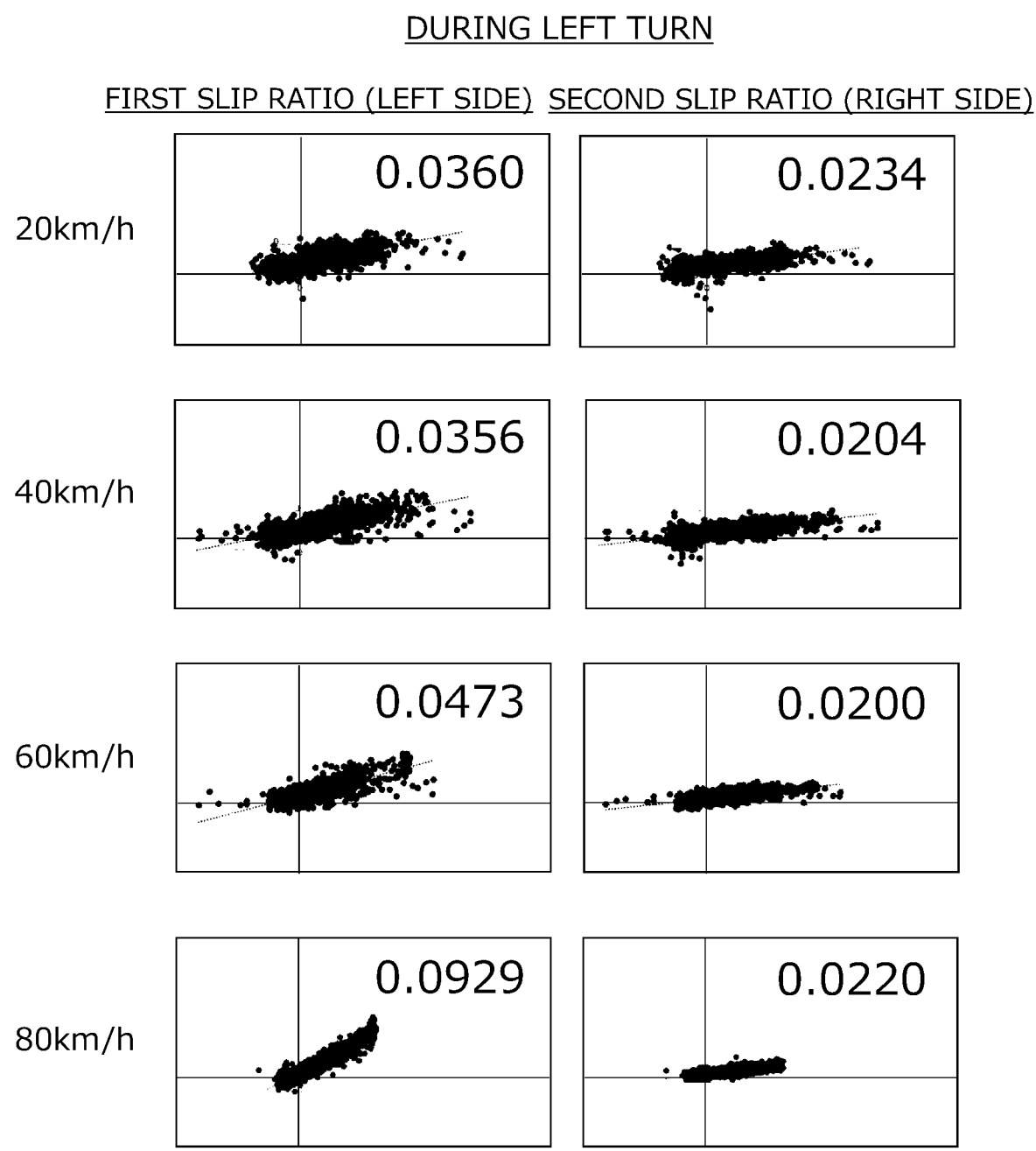
FIG. 14B is a graph showing a relationship between the first slip ratio and second slip ratio and the driving force with respect to various vehicle speeds when performing a left turn.
Figure 14C:
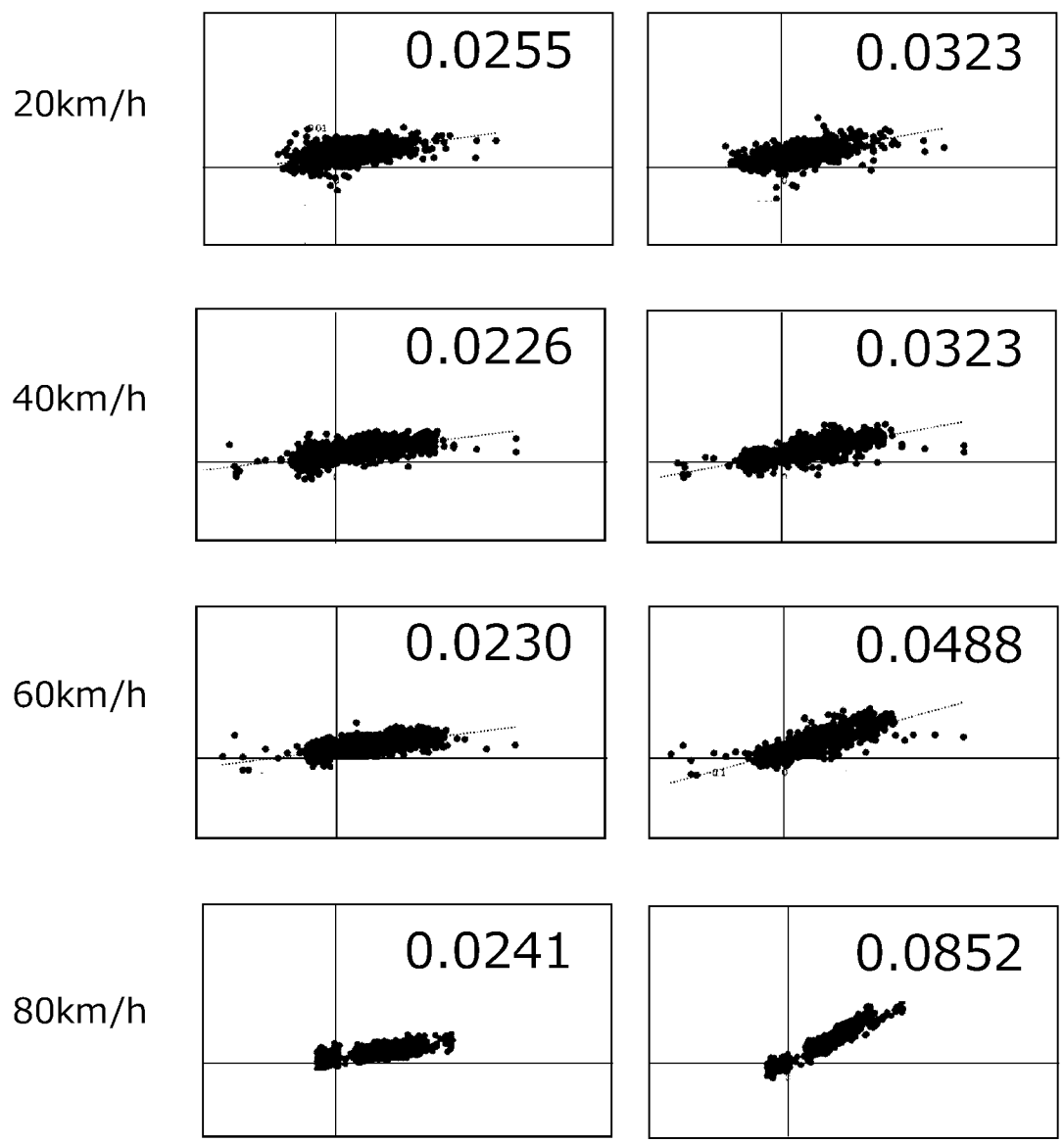
FIG. 14C is a graph showing a relationship between the first slip ratio and second slip ratio and the driving force with respect to various vehicle speeds when performing a right turn.
Figure 15A:
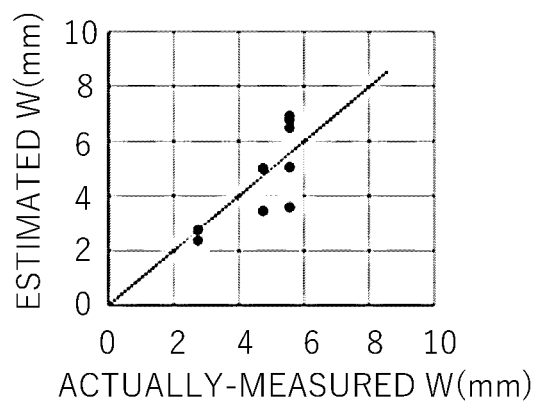
FIGS. 15A-L are graphs showing the result of a wear amount estimation test.
Figure 15B:
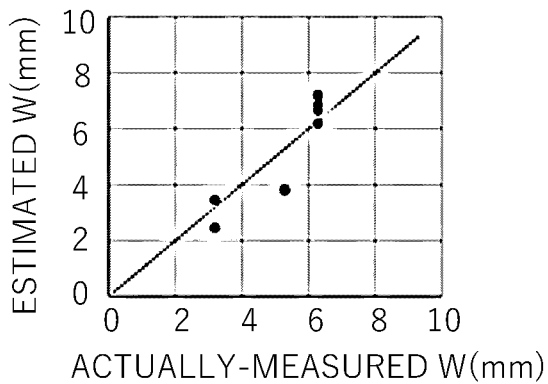
Figure 15C:
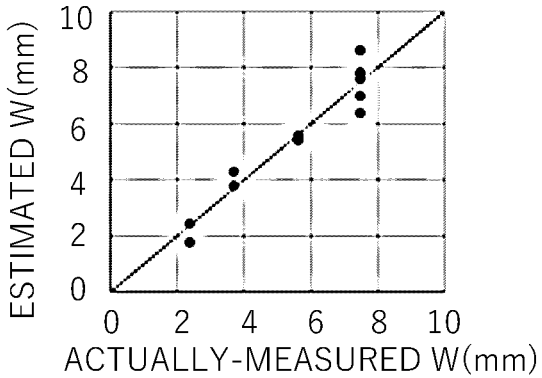
Figure 15D:
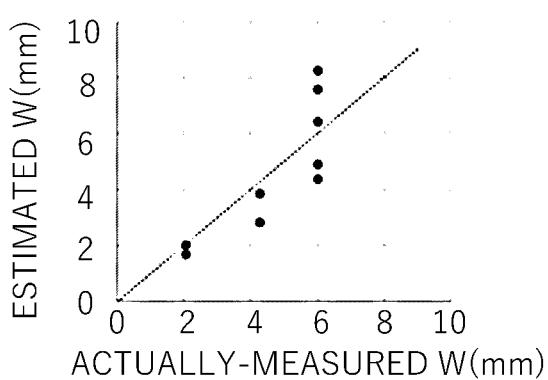
Figure 15E:
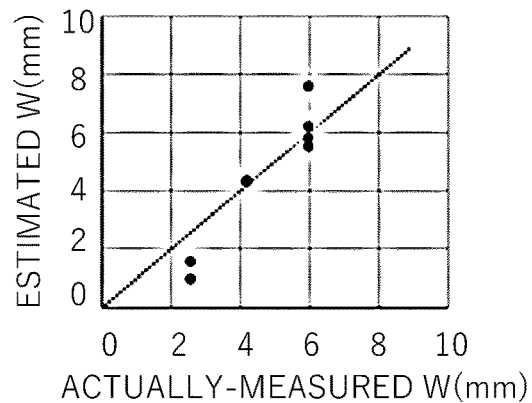
Figure 15F:
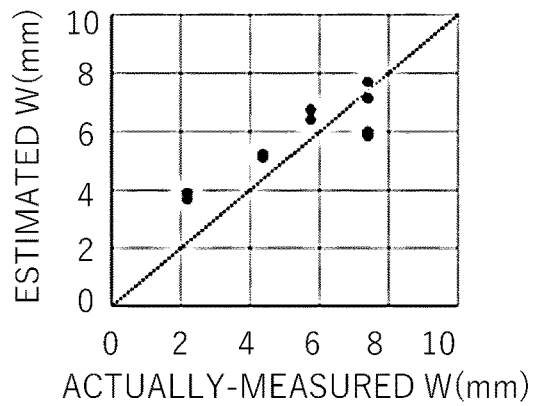
Figure 15G:
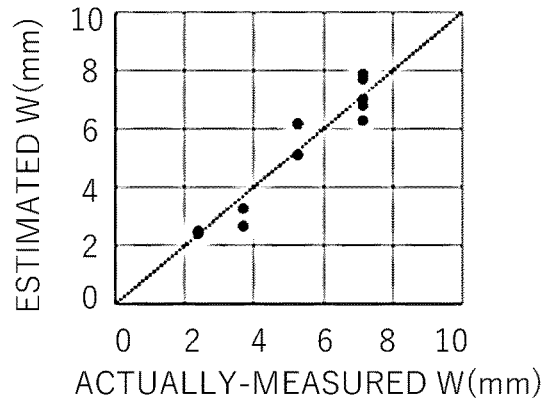
Figure 15H:
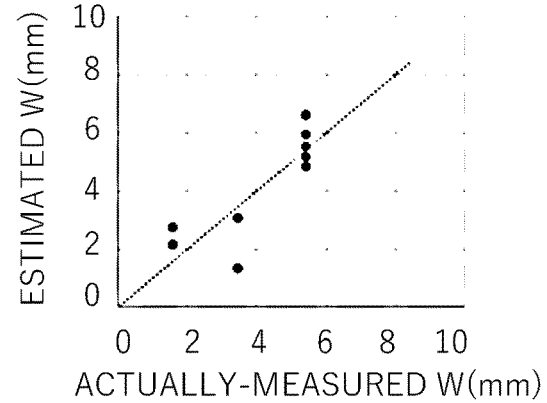
Figure 15I:
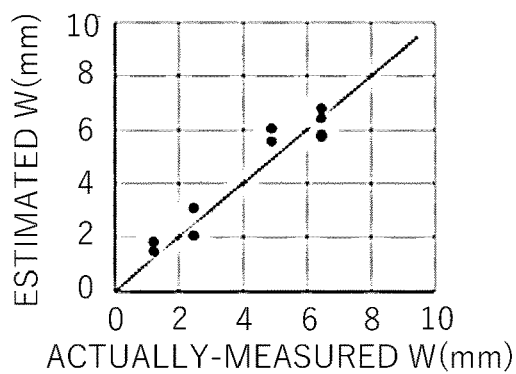
Figure 15J:
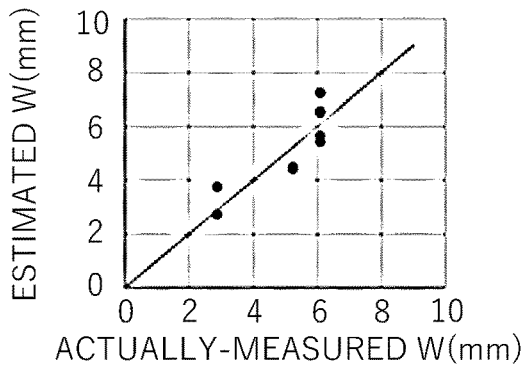
Figure 15K:
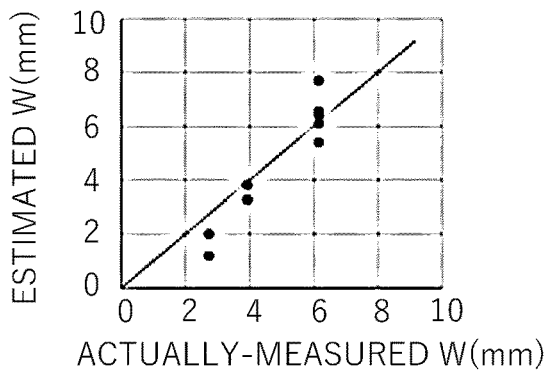
Figure 15L:
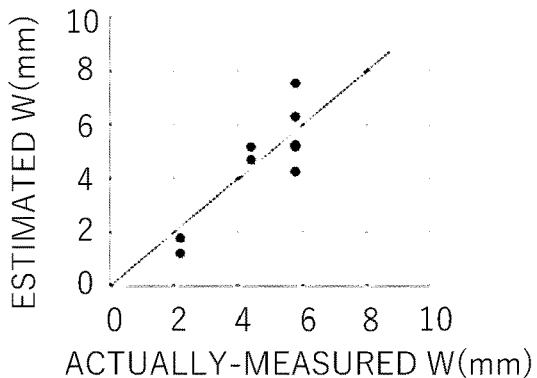

FIG. 13 is a graph showing a linear relationship between three types of slip ratio S and the driving force F at a time of traveling straight, a time of performing a left turn with a smaller lateral acceleration $\gamma$, a time of performing a left turn with a larger lateral acceleration $\gamma$, a time of performing a right turn with a smaller lateral acceleration $\gamma$, a time of performing a right turn with a larger lateral acceleration $\gamma$. Also, FIGS. 14A to 14C are graphs obtained by plotting the relationship between the slip ratio S and the driving force F based on the measurement data obtained when the actual vehicle is caused to travel, the vertical axes indicating the slip ratio and the horizontal axes indicating the driving force F. FIG. 14A shows the relationship between the first slip ratio and second slip ratio and the driving force F when traveling straight, and FIG. 14B shows the relationship between the first slip ratio and second slip ratio and the driving force F when performing a left turn, and FIG. 14C shows the relationship between the first slip ratio and second slip ratio and the driving force F when performing a right turn. In each graph, the value of the slope f1 of the slip ratio S with respect to the driving force F is shown in the upper right. In FIGS. 14A to 14C, graphs are drawn for each vehicle body speed of the vehicle 1. Note that since the magnitude of the lateral acceleration $\gamma$ is proportional to the square of the vehicle body speed, the larger the vehicle body speed, that is, the lower the graph in each figure is, the larger the magnitude of the lateral acceleration $\gamma$ is.

While the vehicle 1 is performing a turn, on the inner side of the turn, the load relatively decreases due to the centrifugal force and the slipping of the tire relatively increases, whereas on the outer side of the turn, the load relatively increases and the slipping of the tire relatively decreases. Also, accompanying this phenomenon, as shown in FIGS. 13 and 14A to 14C, it can be understood that on the inner side of the turn, the slope f1 of the slip ratio S with respect to the driving force F of the vehicle 1 increases the greater the magnitude of the lateral acceleration $\gamma$ is, but on the outer side of the turn, the value of the slope f1 converges and becomes almost constant. Accordingly, when performing a left turn, the slope f1 of the second slip ratio S obtained based on the rotation speed of the right tire converges at the smallest value, and when performing a right turn, the slope f1 of the first slip ratio S obtained based on the rotation speed of the left tire converges at the smallest value. When traveling straight, there is no significant difference in the slope f1 regardless of the slip ratio S. For this reason, either the first slip ratio or the second slip ratio may be selected as the slip ratio when traveling straight, instead of the third slip ratio.

3-6

According to the above-described method, the first to third slip ratios S calculated according to the lateral acceleration $\gamma$ may be further corrected through the processing for correcting the slip ratio S executed in step S29 of the estimation processing of the above-described second embodiment. That is, the first to third slip ratios S calculated according to the lateral acceleration $\gamma$ through the above-described method may be used to calculate the slope f1, and the first to third slip ratios S may be further corrected based on the relationship information with the turn radius R and the result may be used to calculate the slope f1.

3-7

In the estimation processing according to the above-described second embodiment, either step S29 or step S30 may be omitted.

3-8

In the above-described second embodiment, the relationship information is specified when the vehicle is traveling, but the relational information may also be derived in advance and referred to when the slip ratio S is corrected.

Working Example

Test

Various tires T13 to T24 were mounted on four wheels of the same vehicle, the vehicle traveled straight on dry asphalt, and the wear amount W was estimated using the method according to the above-described first embodiment. The tires mounted on the four wheels for each instance of traveling were of the same type and had the same wear amount W. The wear amount W was measured using the difference between the depth of a groove of the new tread and the depth of the groove in the current tread. The change amount $\Delta F$ (=f1$_N$−f1) in the slope f1 with respect to the wear amount W was calculated in advance through testing for each type of tire. Results The results of estimating the wear amounts W for the tires T13 to T24 are as shown in the graphs of FIGS. 15A to 15L. The horizontal axis of each graph is the measured wear amount W, and the vertical axis is the estimated wear amount W. For all types of tires, the estimated wear amount W had an error of about +2 mm, and it was understood that the wear state can be estimated with good accuracy.

LIST OF REFERENCE NUMERALS

1 Vehicle
2, 2A Control unit (estimation apparatus)
3 Display device
4 Lateral acceleration sensor
6 Wheel speed sensor
7 Torque sensor
8 Yaw rate sensor
9 Program
21 Rotation speed acquisition unit
22 Driving force acquisition unit
23 Lateral acceleration acquisition unit
24 Turn radius acquisition unit
25 Slip ratio calculation unit
26 Relationship specification unit
27 Correction unit (first correction unit, second correction unit)
28 Slope calculation unit
29 Estimation unit
FL Left front wheel FR Right front wheel
RL Left rear wheel RR Right rear wheel
V1 to V4 Tire rotation speed

What is claimed is:

1. An estimation apparatus for estimating a wear state of tires mounted on a vehicle, comprising:
   a rotation speed acquisition unit configured to sequentially acquire rotation speeds of the tires;
   a driving force acquisition unit configured to sequentially acquire a driving force of the vehicle;
   a turn radius acquisition unit configured to acquire a turn radius of the vehicle;
   a slip ratio calculation unit configured to calculate a slip ratio based on the sequentially-acquired rotation speeds of the tires;
   a first correction unit configured to correct the slip ratio based on first relationship information indicating a relationship between the turn radius and the slip ratio, and the turn radius at the time of correction;
   a slope calculation unit configured to calculate a slope of a corrected slip ratio corrected by the first correction unit with respect to the driving force based on a large number of data sets of the corrected slip ratio and the driving force, as a regression coefficient indicating a linear relationship between the corrected slip ratio and the driving force; and
   an estimation unit configured to estimate the wear state of the tires based on the slope.

2. The estimation apparatus according to claim 1, further comprising a lateral acceleration acquisition unit configured to sequentially acquire lateral acceleration applied to the vehicle,
   wherein according to the sequentially-acquired lateral acceleration, the slip ratio calculation unit sequentially selects and acquires any one from a group consisting of a first slip ratio, a second slip ratio, and a third slip ratio, the first slip ratio being the slip ratio of the tires calculated based on a rotation speed of a left tire among the sequentially-acquired rotation speeds of the tires, the second slip ratio being the slip ratio of the tires calculated based on a rotation speed of a right tire, and the third slip ratio being the slip ratio of the tires calculated based on an average rotation speed of the left and right tires.

3. The estimation apparatus according to claim 2, wherein according to the lateral acceleration, the slip ratio calculation unit selects the first slip ratio when the vehicle performs a right turn, selects the second slip ratio when the vehicle performs a left turn, and selects the third slip ratio when the vehicle travels straight.

4. The estimation apparatus according to claim 3, wherein the first relationship information is information in which the slip ratio is represented by a quadratic function of a reciprocal of the turn ratio.

5. The estimation apparatus according to claim 2, wherein the first relationship information is information in which the slip ratio is represented by a quadratic function of a reciprocal of the turn ratio.

6. The estimation apparatus according to claim 1, wherein the first relationship information is information in which the slip ratio is represented by a quadratic function of a reciprocal of the turn ratio.

7. The estimation apparatus according to claim 6, further comprising:
   a lateral acceleration acquisition unit configured to sequentially acquire lateral acceleration applied to the vehicle; and
   a second correction unit configured to correct the corrected slip ratio corrected by the first correction unit based on second relationship information indicating a relationship between the lateral acceleration, the driving force, and the slip ratio, and the lateral acceleration and the driving force at the time of correction.

8. The estimation apparatus according to claim 7, wherein the second relationship information is information in which the slip ratio is represented by a linear function of the driving force and the slope of the slip ratio with respect to the driving force is represented by a quadratic function of the lateral acceleration.

9. The estimation apparatus according to claim 1, further comprising:
   a lateral acceleration acquisition unit configured to sequentially acquire lateral acceleration applied to the vehicle; and
   a second correction unit configured to correct the corrected slip ratio corrected by the first correction unit based on second relationship information indicating a relationship between the lateral acceleration, the driving force, and the slip ratio, and the lateral acceleration and the driving force at the time of correction.

10. The estimation apparatus according to claim 9, wherein the second relationship information is information in which the slip ratio is represented by a linear function of the driving force and the slope of the slip ratio with respect to the driving force is represented by a quadratic function of the lateral acceleration.

11. A method for estimating a wear state of tires mounted on a vehicle, comprising:
sequentially acquiring rotation speeds of the tires;
sequentially acquiring a driving force of the vehicle;
acquiring a turn radius of the vehicle;
calculating a slip ratio based on the sequentially-acquired rotation speeds of the tires;
correcting the slip ratio based on relationship information indicating a relationship between the turn radius and the slip ratio, and the turn radius at the time of correction;
calculating a slope of a corrected slip ratio with respect to the driving force based on a large number of data sets of the corrected slip ratio and the driving force, as a regression coefficient indicating a linear relationship between the corrected slip ratio and the driving force; and
estimating the wear state of the tires based on the slope.

12. An estimation apparatus for estimating a wear state of tires mounted on a vehicle, comprising:
a rotation speed acquisition unit configured to sequentially acquire rotation speeds of the tires;
a driving force acquisition unit configured to sequentially acquire a driving force of the vehicle;
a lateral acceleration acquisition unit configured to sequentially acquire lateral acceleration applied to the vehicle;
a slip ratio calculation unit configured to calculate a slip ratio based on the sequentially-acquired rotation speeds of the tires;
a correction unit configured to correct the slip ratio based on relationship information indicating a relationship between the lateral acceleration, the driving force, and the slip ratio, and the lateral acceleration and the driving force at the time of correction;
a slope calculation unit configured to calculate a slope of a corrected slip ratio corrected by the correction unit with respect to the driving force based on a large number of data sets of the corrected slip ratio and the driving force, as a regression coefficient indicating a linear relationship between the corrected slip ratio and the driving force; and
an estimation unit configured to estimate the wear state of the tires based on the slope.

13. The estimation apparatus according to claim 12, wherein according to the sequentially-acquired lateral acceleration, the slip ratio calculation unit sequentially selects and acquires any one from a group consisting of a first slip ratio, a second slip ratio, and a third slip ratio, the first slip ratio being the slip ratio of the tires calculated based on a rotation speed of a left tire among the sequentially-acquired rotation speeds of the tires, the second slip ratio being the slip ratio of the tires calculated based on a rotation speed of a right tire, and the third slip ratio being the slip ratio of the tires calculated based on an average rotation speed of the left and right tires.

14. The estimation apparatus according to claim 12,
wherein the relationship information is information in which the slip ratio is represented by a linear function of the driving force and the slope of the slip ratio with respect to the driving force is represented by a quadratic function of the lateral acceleration.

* * * * *